United States Patent
Ibaragi et al.

(10) Patent No.: US 12,233,623 B2
(45) Date of Patent: Feb. 25, 2025

(54) METAL-FIBER REINFORCED RESIN MATERIAL COMPOSITE BODY AND METHOD FOR PRODUCING METAL-FIBER REINFORCED RESIN MATERIAL COMPOSITE BODY

(71) Applicant: NIPPON STEEL CORPORATION, Tokyo (JP)

(72) Inventors: Masaharu Ibaragi, Tokyo (JP); Noriyuki Negi, Tokyo (JP); Masafumi Usui, Tokyo (JP); Masako Nakai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 765 days.

(21) Appl. No.: 16/976,696

(22) PCT Filed: Feb. 27, 2019

(86) PCT No.: PCT/JP2019/007670
§ 371 (c)(1),
(2) Date: Aug. 28, 2020

(87) PCT Pub. No.: WO2019/168064
PCT Pub. Date: Sep. 6, 2019

(65) Prior Publication Data
US 2020/0406585 A1     Dec. 31, 2020

(30) Foreign Application Priority Data
Feb. 28, 2018   (JP) ................................ 2018-034731

(51) Int. Cl.
B32B 15/08     (2006.01)
B32B 7/022     (2019.01)
(Continued)

(52) U.S. Cl.
CPC .............. *B32B 15/14* (2013.01); *B32B 7/022* (2019.01); *B32B 7/12* (2013.01); *B32B 15/08* (2013.01); *C08L 71/10* (2013.01)

(58) Field of Classification Search
CPC ....... B32B 15/14; B32B 15/08; B32B 15/085; B32B 15/088; B32B 7/12; B32B 27/12; B32B 2307/542
See application file for complete search history.

(56) References Cited

U.S. PATENT DOCUMENTS 11,331,882 B2 *   5/2022   Ibaragi .................. B29C 66/723
11,623,432 B2 *   4/2023   Ibaragi .................. B29C 70/086
                                                                    264/136
(Continued)

FOREIGN PATENT DOCUMENTS

CN   104203543 A       12/2014
EP      3275923 A1 *   1/2018   ............. B05D 1/007
(Continued)

OTHER PUBLICATIONS

United States Court of Appeals for the Federal Circuit, Opinion 2011-1455, Decided Aug. 8, 2012, *Alcon Research, Ltd.* v. *Apotex Inc.*, 687 F.3d 1362, 1369, 103 USPQ2d 1737, 1743 (Fed. Cir. 2012). (Year: 2012).*

(Continued)

*Primary Examiner* — Monique R Jackson
(74) *Attorney, Agent, or Firm* — Birch, Stewart, Kolasch & Birch, LLP

(57) ABSTRACT

A metal-fiber reinforced resin material composite body is provided with: a metal member; a fiber-reinforced resin material which is superposed on at least one surface of the metal member so as to be complexed with the metal member; and a bonding resin layer which is interposed between the metal member and the fiber-reinforced resin material. The fiber-reinforced resin material includes a matrix resin (Continued)

that contains 50 parts by mass or more of a phenoxy resin in 100 parts by mass of the resin component and a reinforcing fiber material that is contained in the matrix resin; the concentration of the phenoxy resin in the resin component of the bonding resin layer is lower than the concentration of the phenoxy resin in the resin component of the matrix resin; and the shear strength between the metal member and the fiber-reinforced resin material is 0.8 MPa or more.

18 Claims, 7 Drawing Sheets

(51) Int. Cl.
*B32B 7/12* (2006.01)
*B32B 15/14* (2006.01)
*C08L 71/10* (2006.01)

(56) References Cited

U.S. PATENT DOCUMENTS

| | | |
|---|---|---|
| 2015/0030864 A1 | 1/2015 | Takeuchi et al. |
| 2015/0321392 A1 | 11/2015 | Stapperfenne et al. |
| 2018/0079879 A1 | 3/2018 | Otsuki et al. |
| 2021/0129488 A1* | 5/2021 | Takahashi ............ B32B 15/095 |

FOREIGN PATENT DOCUMENTS

| | | |
|---|---|---|
| JP | 2013-40299 A | 2/2013 |
| JP | 2013-129775 A | 7/2013 |
| JP | 2015-501853 A | 1/2015 |
| JP | 2015-212085 A | 11/2015 |
| JP | 2016-3257 A | 1/2016 |
| WO | WO 2013/070415 A1 | 5/2013 |
| WO | WO 2016/152856 A1 | 9/2016 |
| WO | WO-2018124215 A1 * | 7/2018 ............ B29C 43/18 |

OTHER PUBLICATIONS

Tanaka, "Infrared Specteroscopy," Journal of the Society of Color Materials, vol. 63, No. 10, 1990, pp. 622-632.

* cited by examiner

METAL-FIBER REINFORCED RESIN MATERIAL COMPOSITE BODY AND METHOD FOR PRODUCING METAL-FIBER REINFORCED RESIN MATERIAL COMPOSITE BODY

FIELD

The present invention relates to a metal-fiber reinforced resin material composite body and a method for producing a metal-fiber reinforced resin material composite body.

BACKGROUND

Fiber reinforced plastics (FRP: Fiber Reinforced Plastics) in which reinforcing fibers (e.g, glass fibers, carbon fibers, etc.) are contained in a matrix resin to form a composite, are lightweight and have excellent tensile strength and workability. Therefore, they are widely used from the consumer sector to industrial applications. In the automotive industry, the application of FRP to automotive members is being studied, focusing on the lightness, tensile strength, workability, etc. of FRP in order to meet the need for a lighter vehicle body that leads to improved fuel efficiency and other performance.

When the FRP itself is used as an automobile member, there are various problems. First, at the time of painting or bending, existing equipment such as a painting line or a bending mold provided for a metal member such as a steel material cannot be directly used for FRP. Second, since FRP has low compressive strength, it is difficult to use FRP as it is for an automobile member requiring high compressive strength. Third, since the FRP matrix resin is generally a thermosetting resin such as an epoxy resin and thus has brittleness, there is a fear of brittle fracture when it is deformed. Fourth, FRP (particularly, Carbon Fiber Reinforced Plastics (CFRP) using carbon fiber as a reinforcing fiber) is expensive, which causes an increase in the cost of automobile members. Fifth, as described above, since a thermosetting resin is used as a matrix resin, the curing time is long and the tact time is long. Therefore, it is not suitable for manufacturing an automobile member requiring a short tact time. Sixth, since FRP using a thermosetting resin as a matrix resin does not plastically deform, it cannot be bent once cured.

In order to solve these problems, recently, a metal member-FRP composite material in which a metal member and FRP are laminated and integrated (composite formation) has been studied. Regarding the first problem as described above, in the case of a metal member-FRP composite material, a metal member such as a steel material can be positioned on the surface of the composite material, so that a coating line or a mold provided for a metal material such as a steel material can be used as it is. Regarding the second problem as described above, the compressive strength of a composite material can be increased by forming a composite of the FRP with a metal member having high compressive strength. Regarding the third problem as described above, by forming a composite with a metal member such as a steel material having ductility, the brittleness of the composite material is reduced and the composite material can be deformed. Regarding the fourth problem as described above, by forming a composite of a low-priced metal member and FRP, the amount of FRP used can be reduced, so that the cost of automobile members can be reduced.

In order to form a composite of a metal member and FRP, it is necessary to bond or adhere the metal member and the FRP. As a bonding method, a method using an epoxy resin-based thermosetting adhesive is generally known.

In addition, in order to solve the problems when using the above FRP for automobile members, recently, use of a thermoplastic resin as a matrix resin of the FRP instead of a thermosetting resin such as an epoxy resin has been studied. Regarding the third problem as described above, since a thermoplastic resin is used as the matrix resin, the FRP can be plastically deformed, and the brittleness can be reduced. Regarding the fifth problem as described above, solidification and softening become easy by using a thermoplastic resin as the matrix resin, so that the tact time can be shortened. Regarding the sixth problem as described above, since the FRP can be plastically deformed as described above, the bending process also becomes easy.

As described above, the above-described problems in the case where the FRP is used as an automobile member can be solved by forming a composite of the metal member and the FRP using a thermoplastic resin as a matrix resin.

Here, regarding the bonding or adhering means between the fiber-reinforced resin material such as FRP and the metal member, technical development has been actively carried out mainly from the viewpoint of strengthening the bonding force between the metal member and the bonding or adhering means.

For example, in Patent Literature 1, a composite body of a reinforcing fiber base material and a metal has been proposed, wherein a bonding surface of a carbon fiber base material with a metal member is impregnated with an adhesive resin such as epoxy-based adhesive resin and the other surface is impregnated with a thermoplastic resin to form a prepreg. According to the method proposed in Patent Literature 1, it is possible to provide an integrally molded product having a strong bonding strength even when bonding different members such as a fiber-reinforced resin material and a metal member.

In addition, Patent Literature 2 as described below proposes a method of manufacturing a sandwich structure using a CFRP molded material using a polyurethane resin matrix with a steel plate. The material of this literature utilizes a good moldability of a thermoplastic polyurethane resin and pursues a high strength by forming a thermoset resin by causing a crosslinking reaction of the polyurethane resin by after-cure.

Further, Patent Literature 3 as described below proposes that a prepreg is prepared by applying a powder of a thermoplastic phenoxy resin, or a resin composition obtained by mixing a crystalline epoxy resin and an acid anhydride as a crosslinking agent to a phenoxy resin, onto a reinforcing fiber base material by a powder coating method, and CFRP is prepared by mold curing the prepreg by a hot press.

CITATION LIST

Patent Literature

Patent Literature 1: Japanese Patent Publication (kokai) No. 2016-3257
Patent Literature 2: Japanese Patent Publication (kokai) No. 2015-212085
Patent Literature 3: International Publication No. 2016/152856
Patent Literature 4: Japanese Patent Publication (kohyo) No. 2015-501853

Patent Literature 7: Japanese Patent Publication (kokai) No. 2013-129775

Non-Patent Literature

Non-Patent Literature 1: Takeyuki Tanaka, Journal of the Society of Color Materials, Vol. 63, No. 10, pp. 622-632, 1990

SUMMARY

Technical Problem

However, in the method proposed in the above-mentioned Patent Literature 1, an epoxy thermosetting resin is used as an adhesive, and a reinforcing fiber is penetrated into an adhesive layer formed by such an adhesive. Thus, the bondability between the fiber reinforced sheet and the metal layer is maintained. Therefore, a non-woven fabric made of fibers having a specific length must be used as the reinforcing fiber base material. As a result, the reinforcing effect is limited as compared with monodirectional fiber reinforcing materials and cloth materials.

Further, since the polyurethane resin used in the above-mentioned Patent Literature 2 is inferior in heat resistance, its strength decreases when it is exposed to high temperatures, so that it is difficult to apply it to members exposed to high temperatures, and its application will be limited.

Further, Patent Literature 3 does not demonstrate various mechanical strengths such as bending strength of a composite body in which CFRP and a metal member are composited.

Based on the above problems, the inventors of the present invention have earnestly studied a method for realizing a composite with a metal member while maintaining the excellent performance of FRP. As a result, it was found to use a phenoxy resin, which is a kind of thermoplastic resin (or a resin composition containing 50 parts by mass or more of phenoxy resin with respect to 100 parts by mass of a resin component. Hereinafter, it is collectively referred to as "phenoxy resin") as a matrix resin of FRP. Since the phenoxy resin has a high polarity and is amorphous among the thermoplastic resins, it is expected that the phenoxy resin is excellent in the impregnation property into the fiber and the performance of FRP can be remarkably improved.

In addition, the inventors of the present invention have separately conducted diligent studies on the bonding of FRP using a thermoplastic resin and a metal member. As a result, it was found that (a) when a metal member and a FRP using a thermoplastic resin (particularly CFRP) are thermocompression-bonded, the reinforcing fiber material in the FRP and the metal member may come into direct contact with each other, and (b) when a conductive substance such as water is present in the state that the reinforcing fiber material and the metal member are in contact with each other, a local battery may be formed and thus cause corrosion so-called electrolytic corrosion.

Here, when the FRP using the phenoxy resin as the matrix resin and the metal member are composited by thermocompression bonding, if the adhesive layer for bonding the FRP and the metal member to each other is a phenoxy resin of the same quality as the matrix resin of the FRP, the mixing of the resins progresses due to heating and pressure application during the thermocompression bonding process. As a result, the contact between the reinforcing fiber material in the FRP and the metal member easily occurs, and the reinforcing fiber material may damage the surface of the metal member or the above-mentioned electrolytic corrosion may occur.

In addition, it is conceivable to bond the FRP and the metal member with an adhesive instead of thermocompression bonding, but a step of applying the adhesive to the surface of the FRP or the metal member will occur, resulting in a decrease in productivity. Moreover, the thickness of the applied adhesive tends to be large, and the excellent performance of the FRP cannot be utilized because the thick adhesive layer is interposed between the FRP and the metal member.

At a glance, the above Patent Literatures 4 and 5 seem to propose a technique for integrating a metal and an FRP via an adhesive layer. However, in the above-mentioned Patent Literatures 4 and 5, what is used as the matrix resin of FRP is a resin composition of a thermosetting resin. Therefore, the phenomenon of contact between the fiber-reinforced resin and the metal member involving the thermocompression bonding, which was found by the present inventors, cannot occur.

The present invention has been made in view of the above problems, and an object of the present invention is to provide a metal-fiber reinforced resin material composite body obtained by bonding a metal member and a fiber-reinforced resin material using a thermoplastic phenoxy resin as a matrix resin without deteriorating the performance of the fiber-reinforced resin material, which can suppress the occurrence of electrolytic corrosion between the metal member and the fiber-reinforced resin material and to provide a method for producing the metal-fiber reinforced resin material composite body.

Solution to Problem

In order to solve the above problems, as a result of further studies by the present inventors, by providing between FRP using a phenoxy resin as a matrix resin and a metal member, an adhesive resin layer using a resin different from the phenoxy resin, it was found that it is possible to prevent direct contact between the reinforcing fiber material in the FRP and the metal member and prevent intrusion of a conductive substance such as water, and as a result, the present invention has been completed.

The gist of the present invention completed based on such findings is as follows.

[1] A metal-fiber reinforced resin material composite body comprising a metal member, a fiber-reinforced resin material laminated on at least one surface of the metal member to form a composite with the metal member, and an adhesive resin layer interposed between the metal member and the fiber-reinforced resin material, wherein the fiber-reinforced resin material comprises a matrix resin containing 50 parts by mass or more of a phenoxy resin with respect to 100 parts by mass of a resin component, and a reinforcing fiber material contained in the matrix resin, wherein the concentration of the phenoxy resin in the resin component of the adhesive resin layer is lower than the concentration of the phenoxy resin in the resin component of the matrix resin, and wherein the shear strength between the metal member and the fiber-reinforced resin material is 0.8 MPa or more.

[2] The metal-fiber reinforced resin material composite body according to item [1], wherein the concentration of the phenoxy resin in the resin component of the adhesive resin layer is 0 part by mass or more and less than 50 parts by mass with respect to 100 parts by mass of the resin component.

[3] The metal-fiber reinforced resin material composite body according to item [1] or [2], wherein the following Formula (2-2) is satisfied $$C > A2 + B \quad \text{Formula (2-2)}$$

wherein, in the above Formula (2-2), the load A2 represents the tensile load of the metal member alone when the metal-fiber reinforced resin material composite body is broken, the load B represents the maximum load of the fiber-reinforced resin material alone, and the load C is the maximum load of the metal-fiber reinforced resin material composite body.

[4] The metal-fiber reinforced resin material composite body according to item [3], wherein the degree of super-law-of-mixture that is the ratio of the load C to the total load of the load A2 and the load B is 1.01 or more.

[5] The metal-fiber reinforced resin material composite body according to item [4], wherein the degree of super-law-of-mixture is 1.05 or more.

[6] The metal-fiber reinforced resin material composite body according to any one of items [1] to [5], wherein the total thickness T1 of the metal member and the elastic coefficient E1 of the metal member, and the total thickness T2 of the fiber-reinforced resin material and the adhesive resin layer and the elastic coefficient E2 of the fiber-reinforced resin material and the adhesive resin layer satisfy the relationship of the following Formula (1)

$$(T1 \times E1)/(T2 \times E2) > 0.3 \quad \text{Formula (1)}$$

[7] The metal-fiber reinforced resin material composite body according to any one of items [1] to [6], wherein the resin component of the adhesive resin layer is a resin component in the state having a storage elastic modulus higher than that of the phenoxy resin in a temperature range not lower than the glass transition temperature of the phenoxy resin and not higher than the processing temperature when the fiber-reinforced resin material is heated and pressure-bonded.

[8] The metal-fiber reinforced resin material composite body according to any one of items [1] to [6], wherein the resin component of the adhesive resin layer is a resin component having a storage elastic modulus higher than that of the phenoxy resin.

[9] The metal-fiber reinforced resin material composite body according to any one of items [1] to [8], wherein the resin component of the adhesive resin layer consists of a thermoplastic resin.

[10] The metal-fiber reinforced resin material composite body according to any one of items [1] to [9], wherein the resin component of the adhesive resin layer consists of a crosslinked cured product of a thermoplastic resin.

[11] The metal-fiber reinforced resin material composite body according to any one of items [1] to [10], wherein the matrix resin is a crosslinked cured product of a crosslinkable resin composition at least containing 50 parts by mass or more of the phenoxy resin with respect to 100 parts by mass of the resin component, and the glass transition temperature of the crosslinked cured product is 160° C. or higher.

[12] The metal-fiber reinforced resin material composite body according to any one of items [1] to [11], wherein the matrix resin is a crosslinked cured product of a crosslinkable resin composition containing the phenoxy resin (A) in the range of 50 parts by mass or more with respect to 100 parts by mass of the resin component and the crosslinkable curable resin (B) in the range of 5 parts by mass or more and 85 parts by mass or less with respect to 100 parts by mass of the phenoxy resin (A).

[13] The metal-fiber reinforced resin material composite body according to any one of items [1] to [12], wherein the metal member is made of at least one kind of metal material selected from a steel material, an iron-based alloy, aluminum or titanium.

[14] The metal-fiber reinforced resin material composite body according to item [13], wherein the steel material is a hot dip galvanized steel sheet, an electrogalvanized steel sheet or an aluminum plated steel sheet.

[15] A metal-fiber reinforced resin material composite body comprising a metal member, a fiber-reinforced resin material laminated on at least one surface of the metal member to form a composite with the metal member, and an adhesive resin layer interposed between the metal member and the fiber-reinforced resin material, wherein the fiber-reinforced resin material comprises a matrix resin and a reinforcing fiber material contained in the matrix resin, wherein the matrix resin is a crosslinked cured product of a crosslinkable resin composition containing a phenoxy resin (A) in the range of 50 parts by mass or more with respect to 100 parts by mass of the resin component and a crosslinkable curable resin (B) in the range of 5 parts by mass or more and 85 parts by mass or less with respect to 100 parts by mass of the phenoxy resin (A), wherein the concentration of the phenoxy resin in the resin component of the adhesive resin layer is lower than the concentration of the phenoxy resin in the resin component of the matrix resin, and wherein the shear strength between the metal member and the fiber-reinforced resin material is 0.8 MPa or more.

[16] The metal-fiber reinforced resin material composite body according to item [15], wherein the glass transition temperature changes by heating before and after the resin constituting the matrix resin changes from a solidified product in a first cured state to a crosslinked cured product in a second cured state.

[17] The metal-fiber reinforced resin material composite body according to item [15] or [16], wherein the concentration of the phenoxy resin in the resin component of the adhesive resin layer is 0 part by mass or more and less than 50 parts by mass with respect to 100 parts by mass of the resin component.

[18] The metal-fiber reinforced resin material composite body according to any one of items [15] to [17], wherein the following Formula (2-2) is satisfied $$C > A2 + B \quad \text{Formula (2-2)}$$

wherein, in the above Formula (2-2), the load A2 represents the tensile load of the metal member alone when the metal-fiber reinforced resin material composite body is broken, the load B represents the maximum load of the fiber-reinforced resin material alone, and the load C is the maximum load of the metal-fiber reinforced resin material composite body.

[19] The metal-fiber reinforced resin material composite body according to item [18], wherein the degree of super-law-of-mixture that is the ratio of the load C to the total load of the load A2 and the load B is 1.01 or more.

[20] The metal-fiber reinforced resin material composite body according to item [19], wherein the degree of super-law-of-mixture is 1.05 or more.

[21] The metal-fiber reinforced resin material composite body according to any one of items [15] to [20], wherein the total thickness T1 of the metal member and the elastic coefficient E1 of the metal member, and the total thickness T2 of the fiber-reinforced resin material and the adhesive resin layer and the elastic coefficient E2 of the fiber-reinforced resin material and the adhesive resin layer satisfy the relationship of the following Formula (1)

$$(T1 \times E1)/(T2 \times E2) > 0.3 \qquad \text{Formula (1)}$$

[22] The metal-fiber reinforced resin material composite body according to any one of items [15] to [21], wherein the resin component of the adhesive resin layer is a resin component in the state having a storage elastic modulus higher than that of the phenoxy resin in a temperature range not lower than the glass transition temperature of the phenoxy resin and not higher than the processing temperature when the fiber-reinforced resin material is heated and pressure-bonded.

[23] The metal-fiber reinforced resin material composite body according to any one of items [15] to [21], wherein the resin component of the adhesive resin layer is a resin component having a storage elastic modulus higher than that of the phenoxy resin.

[24] The metal-fiber reinforced resin material composite body according to any one of items [15] to [23], wherein the resin component of the adhesive resin layer consists of a thermoplastic resin.

[25] The metal-fiber reinforced resin material composite body according to any one of items [15] to [24], wherein the resin component of the adhesive resin layer consists of a crosslinked cured product of a thermoplastic resin.

[26] The metal-fiber reinforced resin material composite body according to any one of items [15] to [25], wherein the glass transition temperature of the matrix resin is 160° C. or higher.

[27] The metal-fiber reinforced resin material composite body according to any one of items [15] to [26], wherein the metal member is made of at least one kind of metal material selected from a steel material, an iron-based alloy, aluminum or titanium.

[28] The metal-fiber reinforced resin material composite body according to item [27], wherein the steel material is a hot dip galvanized steel sheet, an electrogalvanized steel sheet or an aluminum plated steel sheet.

[29] A method for producing a metal-fiber reinforced resin material composite body comprising a metal member, a fiber-reinforced resin material laminated on at least one surface of the metal member to form a composite with the metal member, and an adhesive resin layer interposed between the metal member and the fiber-reinforced resin material, comprising:
  preparing a fiber-reinforced resin material or a fiber-reinforced resin material prepreg containing a reinforcing fiber base material made of a reinforcing fiber material and a matrix resin or a matrix resin in a first cured state impregnated into the reinforcing fiber material and containing at 50 parts by mass or more of a phenoxy resin with respect to 100 parts by mass of the resin component, and a resin sheet composed of a resin component whose concentration of a phenoxy resin is lower than the concentration of the phenoxy resin in the resin component of the matrix resin, respectively,
  stacking a metal member, the resin sheet, and the fiber-reinforced resin material or the fiber-reinforced resin material prepreg in this order to form a stack, and
  heating and press-bonding the stack to form a composite body, wherein when the matrix resin is a resin that can be heat-cured, the resin constituting the matrix resin is changed from a first cured state to a second cured state, while changing the glass transition temperature of the resin constituting the matrix resin, and wherein the shear strength between the metal member and the fiber-reinforced resin material after said heating is 0.8 MPa or more.

[30] The method for producing a metal-fiber reinforced resin material composite body according to item [29], wherein the matrix resin in the first cured state is a cross-linked cured product of a crosslinkable resin composition containing 50 parts by mass or more of phenoxy resin (A) with respect to 100 parts by mass of the resin component, and the cross-linkable curable resin (B) within the range of 5 parts by mass or more and 85 parts by mass or less with respect to 100 parts by mass of the phenoxy resin (A), wherein the first cured state is formed by a solidified product of the resin constituting the matrix resin, and the second cured state is formed by a crosslinked cured product of the resin constituting the matrix resin.

[31] The method for producing a metal-fiber reinforced resin material composite body according to item [29] or [30], wherein the obtained metal-fiber reinforced resin material composite body satisfies the following Formula (2-2)

$$C > A2 + B \qquad \text{Formula (2-2)}$$

wherein, in the above Formula (2-2), the load A2 represents the tensile load of the metal member alone when the obtained metal-fiber reinforced resin material composite body is broken, the load B represents the maximum load of the obtained fiber-reinforced resin material alone, and the load C is the maximum load of the obtained metal-fiber reinforced resin material composite body.

[32] The method for producing a metal-fiber reinforced resin material composite body according to item [31], wherein the degree of super-law-of-mixture that is the ratio of the load C to the total load of the load A2 and the load B is 1.01 or more.

[33] The method for producing a metal-fiber reinforced resin material composite body according to item [32], wherein the degree of super-law-of-mixture is 1.05 or more.

[34] The method for producing a metal-fiber reinforced resin material composite body according to any one of items [29] to [33], wherein the total thickness T1 of the metal member and the elastic coefficient E1 of the metal member, and the total thickness T2 of the obtained fiber-reinforced resin material and the adhesive resin layer and the elastic coefficient E2 of the fiber-reinforced resin material and the adhesive resin layer satisfy the relationship of the following Formula (1)

$$(T1 \times E1)/(T2 \times E2) > 0.3 \qquad \text{Formula (1)}$$

[35] The method for producing a metal-fiber reinforced resin material composite body according to any one of items [29] to [34], wherein the resin component of the resin sheet is a resin component in the state having a storage elastic modulus higher than that of the phenoxy resin in a temperature range not lower than the glass transition temperature of the phenoxy resin and not higher than the processing temperature when the fiber-reinforced resin material is heated and pressure-bonded.

[36] The method for producing a metal-fiber reinforced resin material composite body according to any one of items [29] to [34], wherein the resin component of the resin sheet is a resin component having a storage elastic modulus higher than that of the phenoxy resin.

[37] The method for producing a metal-fiber reinforced resin material composite body according to any one of items [29] to [36], wherein the resin component of the resin sheet consists of a thermoplastic resin.

[38] The method for producing a metal-fiber reinforced resin material composite body according to any one of items [29] to [37], wherein the resin component of the resin sheet consists of a crosslinked cured product of a thermoplastic resin.

[39] The method for producing a metal-fiber reinforced resin material composite body according to any one of items [29] to [38], wherein the matrix resin after forming the composite body is a crosslinked cured product of a crosslinkable resin composition at least containing 50 parts by mass or more of the phenoxy resin with respect to 100 parts by mass of the resin component, and the glass transition temperature of the crosslinked cured product is 160° C. or higher.

[40] The method for producing a metal-fiber reinforced resin material composite body according to any one of items [29] to [39], wherein the matrix resin after forming the composite body is a crosslinked cured product of a crosslinkable resin composition containing 50 parts by mass or more of the phenoxy resin (A) with respect to 100 parts by mass of the resin component, and the crosslinkable curable resin (B) within the range of 5 parts by mass or more and 85 parts by mass or less with respect to 100 parts by mass of the phenoxy resin (A).

[41] The method for producing a metal-fiber reinforced resin material composite body according to any one of items [29] to [40], wherein the metal member is made of at least one kind of metal material selected from a steel material, an iron-based alloy, aluminum or titanium.

[42] The method for producing a metal-fiber reinforced resin material composite body according to item [41], wherein the steel material is a hot dip galvanized steel sheet, an electrogalvanized steel sheet or an aluminum plated steel sheet.

Advantageous Effects of Invention

As described above, according to the present invention, it is possible to bond a fiber-reinforced resin material using a thermoplastic phenoxy resin as a matrix resin, to a metal member without reducing the performance of the fiber-reinforced resin material, and suppress the occurrence of electrolytic corrosion between the metal member and the fiber-reinforced resin material.

DESCRIPTION OF EMBODIMENTS

Figure 1:
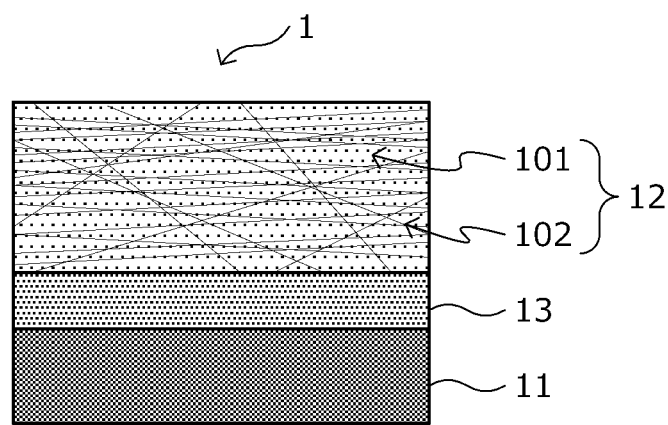
FIG. 1 is a schematic view showing a cross-sectional structure of a metal-fiber reinforced resin material composite body according to a first embodiment of the present invention.

Hereinafter, preferred embodiments of the present invention will be described in detail with reference to the accompanying drawings. In the specification and the drawings, components having substantially the same functional configuration are denoted by the same reference numerals to avoid redundant description.

<Configuration of Metal-fiber Reinforced Resin Material Composite Body>

Figure 2:
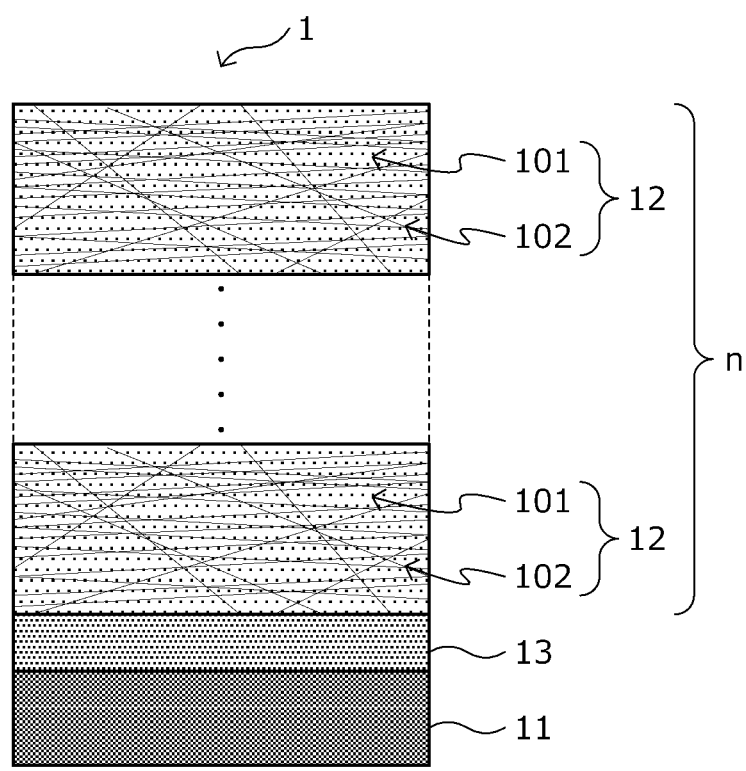
FIG. 2 is a schematic view showing a cross-sectional structure of another aspect of a metal-fiber reinforced resin material composite body according to the same embodiment.

First, the configuration of the metal-fiber reinforced resin material composite body according to an embodiment of the present invention will be described with reference to FIG. 1 and FIG. 2. FIG. 1 and FIG. 2 are schematic view showing a cross-sectional structure in the stacking direction of a metal-FRP composite body 1 as an example of a metal-fiber reinforced resin material composite body according to the present embodiment.

As shown in FIG. 1, the metal-FRP composite body 1 includes a metal member 11, an FRP layer 12 as an example of a first fiber-reinforced resin material according to the present embodiment, and an adhesive resin layer 13. The metal member 11 and the FRP layer 12 are formed into a composite via the adhesive resin layer 13. Here, "formed into composite (composite formation)" means that the metal member 11 and the FRP layer 12 (first fiber-reinforced resin material) are bonded (attached) via the adhesive resin layer 13 to be integrated. Also, "integrated" means that the metal member 11, the FRP layer 12 (first fiber-reinforced resin material), and the adhesive resin layer 13 move as a single unit when being processed or deformed.

In the metal-FRP composite body 1, the concentration of the phenoxy resin in the resin component of the adhesive resin layer 13 is lower than the concentration of the phenoxy resin in the resin component of the matrix resin of the FRP layer 12, as described later. Further, the concentration of the phenoxy resin in the resin component of the adhesive resin layer 13 is preferably 0 part by mass or more and less than 50 parts by mass with respect to 100 parts by mass of the resin component. The adhesive resin layer 13 according to the present embodiment is composed of a solidified product or a cured product of the adhesive resin composition in the above state.

Incidentally, when simply referred to as "solidified product", it means that a resin component itself has been solidified, and when it is referred to as "cured product", it refers to a resin component which is cured by incorporating various curing agents to the resin component. Incidentally, the curing agent that can be incorporated in the cured product also includes a crosslinking agent as described below, and the "cured product" as described above includes a crosslinked cured product.

In the present embodiment, the adhesive resin layer 13 is provided so as to be in contact with at least one surface of the metal member 11, and firmly bonds the metal member 11 and the FRP layer 12. However, the adhesive resin layer 13 and the FRP layer 12 may be provided not only on one side of the metal member 11 but also on both sides. Further, a laminate including the adhesive resin layer 13 and the FRP layer 12 may be disposed between the two metal members 11.

Since the metal-FRP composite body 1 has the above-described structure, direct contact between the reinforcing fiber material in the FRP layer 12 using the phenoxy resin as the matrix resin and the metal member 11 is prevented. Further, the integration of the metal member 11 and the FRP layer 12 is promoted. As a result, the shear strength between the metal member 11 and the FRP layer 12 becomes 0.8 MPa or more. Here, the shear strength is measured by a "shear test" described later. A value of 0.8 MPa corresponds to 40 N/5 mm.

In addition, in the metal-FRP composite body 1, it is preferable to satisfy the relationship expressed by the following Formula (1) of the total thickness T1 of the metal member 11 and the elastic coefficient E1 of the metal member 11, and the total thickness T2 of the FRP layer 12 and the elastic coefficient E2 of the FRP layer 12. Details of this relationship will be described later.

$$T1 \times E1 > 0.3 \times T2 \times E2 \quad \text{Formula (1)}$$

Hereinafter, each component of the metal-FRP composite body 1 and other configurations will be described in detail.
(Metal Member 11)

The material, shape and thickness of the metal member 11 are not particularly limited as long as they can be formed by pressing or the like, but the shape is preferably a thin plate. Examples of the material for the metal member 11 include, for example, iron, titanium, aluminum, magnesium and alloys thereof. Here, examples of the alloy include, for example, an iron-based alloy (including stainless steel), a Ti-based alloy, an Al-based alloy, and a Mg alloy. The material for the metal member 11 is preferably a steel material, an iron-based alloy, titanium and aluminum, and more preferably a steel material having a higher elastic modulus than other metal types. Examples of such a steel material include steel materials such as cold rolled steel sheets for general use, drawing or ultra deep drawing specified by Japanese Industrial Standards (JIS) as thin sheet steel sheets used for automobiles; workable cold-rolled high-tensile steel sheet for automobiles; hot-rolled steel sheet for general and working use; hot-rolled steel sheet for automobile structure; workable hot-rolled high-tensile steel sheet for automobiles. Examples of such a steel material further includes carbon steel, alloy steel, high-tensile steel and the like used for general structural and mechanical structure purposes as steel materials which are not limited to thin plates.

Any surface treatment may be applied to the steel material. Here, the surface treatment includes, for example, various plating treatments such as galvanizing (hot-dip galvanized steel sheet, electrogalvanizing, etc.) and aluminum plating, chemical conversion treatments such as chromate treatment and non-chromate treatment, and physical surface roughening treatment such as sand blasting or chemical surface roughening treatment such as chemical etching, but is not limited thereto. Further, alloying of plating and plural kinds of surface treatments may be performed. As the surface treatment, at least a treatment for the purpose of imparting rust resistance is preferably performed.

In order to enhance the adhesiveness to the FRP layer 12, it is preferable to treat the surface of the metal member 11 with a primer. As a primer used in this treatment, for example, a silane coupling agent or a triazinethiol derivative is preferable. Examples of the silane coupling agent include an epoxy silane coupling agent, an amino silane coupling agent, and an imidazole silane compound. Examples of triazine thiol derivatives include 6-diallylamino-2,4-dithiol-1,3,5-triazine, 6-methoxy-2,4-dithiol-1,3,5-triazine monosodium, 6-propyl-2,4-dithiolamino-1,3,5-triazine monosodium and 2,4,6-trithiol-1,3,5-triazine.

Here, depending on the material of the metal member 11, an oil film may be formed on the surface of the metal member 11 from the viewpoint of rust prevention or the like. For example, when the metal member 11 is a hot-dip galvanized steel plate, an electro-galvanized steel plate, or an aluminum-plated steel plate among other steel materials, an oil film made of rust-preventive oil is often formed on the surface of the metal member 11. It is sometimes difficult to bond the FRP and the metal member 11 with a sufficient bonding strength, when an attempt is made to bond the FRP and the metal member 11 while such an oil film is formed on the surface of the metal member 11. That is, it may be difficult to produce the metal-FRP composite body 1 exhibiting the super-addition rule (super-law-of-mixture) such that the maximum load of the metal-FRP composite body exceeds addition rule (law of mixture). Therefore, when an oil film is formed on the surface of the metal member 11, it is preferable to perform a degreasing treatment before bonding with the FRP. As a result, the FRP and the metal member 11 can be bonded with a sufficient bonding strength, and the metal-FRP composite body 1 can easily obtain a strength exceeding the law of mixture described later. Incidentally, regarding the necessity of degreasing, the intended metal member 11 is bonded and integrated with the intended FRP with the intended adhesive resin composition without a degreasing step in advance to confirm and judge as to whether or not a super-law-of-mixture is actually achieved. The addition rule (law of mixture) and super-addition rule (super-law-of-mixture) will be described later.

As above, the metal member 11 according to the present embodiment has been described in detail.
(FRP Layer 12)

The FRP layer 12 has a matrix resin 101 and a reinforcing fiber material 102 contained in the matrix resin 101 to form a composite.

A phenoxy resin, which is a kind of thermoplastic resin, is used for the matrix resin 101 used for the FRP layer 12.

Here, if a various kind of a thermosetting resin is used as the matrix resin 101, problems such as brittleness of the FRP layer 12, long tact time, and inability to perform bending may occur, as described above. From the viewpoint of solving such problems, it is important to use a thermoplastic resin as the matrix resin 101. However, a general thermoplastic resin other than the phenoxy resin has a high viscosity when melted, and cannot be impregnated into the reinforcing fiber material 102 in a low viscosity state unlike a thermosetting resin such as an epoxy resin before thermosetting. Therefore, its impregnating property to the reinforcing fiber material 102 is poor. As a result, the reinforcing fiber density (VF: Volume Fraction) in the FRP layer 12 cannot be increased unlike the case where a thermosetting resin is used as the matrix resin 101. Taking carbon fiber reinforced plastic (CFRP) using carbon fibers as the reinforcing fiber material 102 as an example, when an epoxy resin is used as the matrix resin 101, VF can be about 60%. However, when a thermoplastic resin such as propylene or nylon is used as the matrix resin 101, the VF becomes about 50%. Here, in order for the FRP to exhibit an excellent tensile strength, it is necessary that the matrix resin 101 is impregnated into the reinforcing fiber material 102 in a state where the fibers constituting the reinforcing fiber material 102 are drawn at a high density and strongly in the same direction. However, it is difficult for the matrix resin 101 to impregnate into the reinforcing fiber material 102 in such a state. If the reinforcing fiber material 102 is not sufficiently impregnated with the matrix resin 101 and a defect such as a void occurs in the FRP, not only does the FRP not show the desired tensile strength, but also the FRP may occur brittle fracture starting from the defect. Therefore, the ability of impregnation is very important. In addition, when a thermoplastic resin such as polypropylene or nylon is used, the FRP layer 12 cannot have high heat resistance as when a thermosetting resin such as an epoxy resin is used.

In order to solve the problem when using such a thermoplastic resin, a phenoxy resin is used as the matrix resin 101 in the present embodiment. Since the molecular structure of the phenoxy resin is very similar to that of the epoxy resin, the phenoxy resin has the similar level of heat resistance to the epoxy resin, and has a good adhesiveness to the adhesive resin layer 13 and the metal member 11. Furthermore, a so-called partially cured resin can be obtained by adding a curing component such as an epoxy resin to the phenoxy resin and copolymerizing the same. By using such a phenoxy resin as the matrix resin 101, it is possible to obtain a matrix resin that is excellent in impregnation into the reinforcing fiber material 102. Further, by thermally curing the curing component in the partially cured resin, it is possible to prevent the matrix resin 101 in the FRP layer 12 from melting or softening when exposed to a high temperature, as in a normal thermoplastic resin. The amount of the curing component added to the phenoxy resin may be appropriately determined in consideration of the impregnating property to the reinforcing fiber material 102, the brittleness of the FRP layer 12, the tact time, the workability, and the like. As described above, by using a phenoxy resin as the matrix resin 101, it becomes possible to add and control a curing component with a high degree of freedom.

For example, when carbon fiber is used as the reinforcing fiber material 102, a sizing agent that is familiar with an epoxy resin is often applied to the surface of the carbon fiber. Since the chemical structure of the phenoxy resin is very similar to that of the epoxy resin, the sizing agent for the epoxy resin can be used as it is by using the phenoxy resin as the matrix resin 101. Therefore, cost competitiveness can be enhanced. Incidentally, in the present embodiment, the volume fraction VF of the fibers in the FRP is preferably 30 to 70%, more preferably 40 to 60%.

In the metal-FRP composite body 1, the matrix resin 101 of the FRP layer 12 and the resin constituting the adhesive resin layer 13 (details will be described later) are not the same resin or the same type of resin. They are different resin in that the concentration of the phenoxy resin satisfies the condition as described above (the concentration of the phenoxy resin of the adhesive resin layer 13 is lower than the phenoxy resin concentration of the matrix resin 101, and the resin constituting the adhesive resin layer 13 is preferably a resin which does not contain a phenoxy resin as a main component (more specifically, a resin which can contain 0 parts by mass or more and less than 50 parts by mass of the phenoxy resin in 100 parts by mass of all the resin components). The reason why such a condition is required will be described later.

Here, "the same resins" mean that they include the same components and have the same composition ratios, and "the same type of resins" mean that if their main components are the same, their composition ratios may be different. "The same type of resins" include "the same resins". Further, the "main component" means a component contained in an amount of 50 parts by mass or more based on 100 parts by mass of all resin components. The "resin component" includes a thermoplastic resin and a thermosetting resin, but does not include a non-resin component such as a crosslinking agent.

The reinforcing fiber material 102 is not particularly limited, but is preferably, for example, carbon fiber, boron fiber, silicon carbide fiber, glass fiber, aramid fiber, or the like, and more preferably carbon fiber. For the type of carbon fiber, for example, any of PAN-based and pitch-based ones can be used, and may be selected according to the purpose and use. Further, as the reinforcing fiber material 102, one type of the above-described fiber may be used alone, or a plurality of types may be used in combination. When glass fiber is used as the reinforcing fiber material 102, if the glass fiber penetrates the adhesive resin layer 13 described later, it is considered that the surface of the metal member 11 may be damaged by the penetrating glass fiber. From this point of view, it is preferable to use carbon fiber as the reinforcing fiber material 102.

In the FRP used for the FRP layer 12, as the reinforcing fiber base material serving as the base material of the reinforcing fiber material 102, for example, a nonwoven fabric base material using chopped fibers, a cloth material using continuous fibers, and a unidirectional reinforcing fiber base material (UD material) or the like can be used. From the viewpoint of the reinforcing effect, it is preferable to use a cloth material or a UD material as the reinforcing fiber base material.

In the metal-FRP composite body 1, the FRP layer 12 is formed using at least one or more FRP molding prepregs. The FRP layer 12 is not limited to one layer, and may be two or more layers, for example, as shown in FIG. 2. The thickness of the FRP layer 12 and the number n of the FRP layers 12 when the FRP layer 12 has a plurality of layers may be appropriately set according to the purpose of use. When there are a plurality of FRP layers 12, each layer may have the same configuration or may be different. That is, the resin type of the matrix resin 101 constituting the FRP layer 12, and the type and content ratio of the reinforcing fiber material 102 may be different from each layer.

Hereinafter, the phenoxy resin constituting the matrix resin 101 of the FRP layer 12 will be described in detail.
Resin Composition The matrix resin 101 of the FRP layer 12 is composed of a solidified product or a cured product of a resin composition containing 50 parts by mass or more of the phenoxy resin (A) with respect to 100 parts by mass of the resin component. By using such an adhesive resin composition, the above-mentioned problems can be solved which cannot be realized by various thermosetting resins or general thermoplastic resins, and the FRP layer 12 having high performance can be realized. The resin composition preferably contains 55 parts by mass or more of the phenoxy resin (A) based on 100 parts by mass of the resin component. The resin composition may be in the form of powder, liquid such as varnish, or solid such as film.

Figure 3:
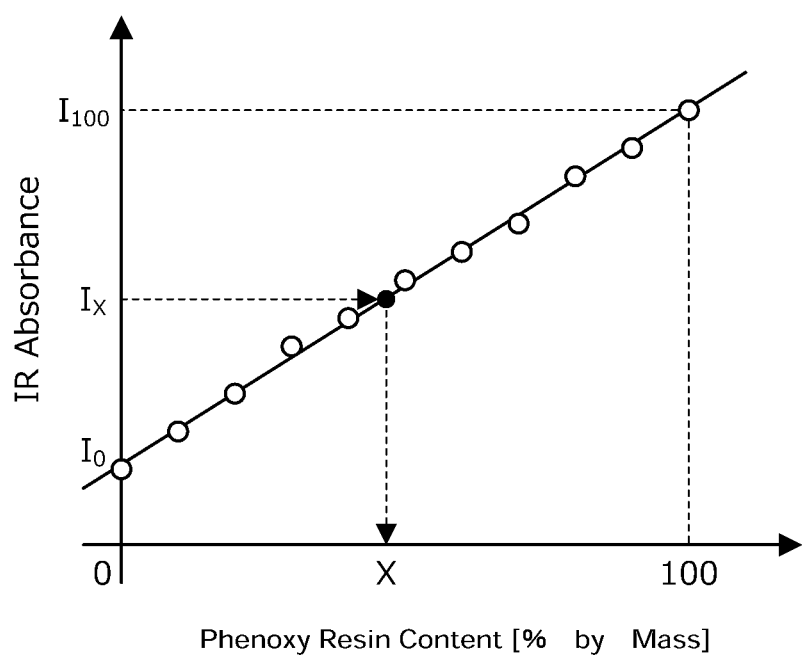
FIG. 3 is an explanatory diagram for explaining a method for measuring the content of a phenoxy resin.

The content of the phenoxy resin (A) can be measured by infrared spectroscopy (IR: InfraRed spectroscopy) as described below, and when the content ratio of the phenoxy resin from the resin composition of interest by IR is analyzed, it can be measured according to the method disclosed in the above Non-Patent Literature 1. Specifically, it can be measured by using a general method of IR analysis such as a transmission method or an ATR reflection method. Hereinafter, a method for measuring the content of the phenoxy resin will be specifically described with reference to FIG. 3. FIG. 3 is an explanatory diagram for explaining a method for measuring the content of the phenoxy resin.

The FRP layer 12 is cut out with a sharp knife or the like, the fibers are removed as much as possible with tweezers or the like, and the resin composition to be analyzed is sampled from the FRP layer 12. In the case of the transmission method, a KBr powder and a powder of the resin composition to be analyzed are crushed while being uniformly mixed in a mortar or the like to form a thin film, which is used as a sample. In the case of the ATR reflection method, a tablet as a sample may be prepared by crushing the powder while uniformly mixing it in a mortar, similarly to the transmission method, or a surface of a single-crystal KBr tablet (for example, 2 mm in diameter×1.8 mm thickness) may be scratched with a file or the like, and the resin composition to be analyzed is dusted and adhered to make a sample. In any method, it is important to measure the background of KBr alone before mixing with the resin to be analyzed. As the IR measuring device, a commercially available general measuring device can be used, but an apparatus having the absorbance in distinguishable analysis accuracy of 1% unit, and the wavenumber in distinguishable analysis accuracy of 1 $cm^{-1}$ unit is preferable. Examples of the apparatus include FT/IR-6300 manufactured by JASCO Corporation.

When investigating the content of the phenoxy resin (A), the absorption peaks of the phenoxy resin are as shown in FIGS. 2, 3, 4, 6, and 7 of the above-described Non-Patent Literature 1. When only those absorption peaks disclosed in the above-described Non-Patent Literature 1 are observed in the measured IR spectrum, it is determined that the composition is composed of only the phenoxy resin.

On the other hand, when a peak other than the absorption peaks disclosed in the above-described Non-Patent Literature 1 is detected, it is determined that the resin composition contains another resin composition, and the content thereof is estimated as follows. The mixing ratios of the powder of the resin composition to be analyzed and the powder of the phenoxy resin composition (for example, Phenotote YP-50S manufactured by Nippon Steel & Sumikin Chemical Co., Ltd.) in a mass ratio of 100:0, 90:10, 80:20, 70:30, 60:40, 50:50, 40:60, 30:70, 20:80, 10:90 and 0:100 are used to be analyzed by IR analysis, and the change in the intensity of the peak (e,g., 1450-1480 $cm^{-1}$, near 1500 $cm^{-1}$, near 1600 $cm^{-1}$, etc.) is recorded. Based on the obtained change in intensity, a calibration curve is created as shown in FIG. 3. By using the obtained calibration curve, the phenoxy resin content of a sample whose phenoxy resin content is unknown can be determined.

Specifically, if the phenoxy content of the resin composition to be analyzed is X %, X % can be estimated from the change in strength when the content of the phenoxy resin is varied from X % to 100%. That is, when measured at the above mixing ratio, the content of the phenoxy resin varies from X, $_{0.9}$X+10, 0.8X+20, 0.7X+30 ... 0.2X+80, 0.1X+90 to 100%. A graph having a horizontal axis representing the content and a vertical axis representing the absorbance peak intensity is made by plotting points, and a straight line connecting each point can be drawn on the graph. Here, if the intensity at the content of 100% is $I_{100}$, the intensity at the content of X % is $I_X$, and the intensity at the content of 0%, that is, Y intercept of the graph is $I_0$, then $(I_X-I_0)/(I_{100}-I_0) \times 100 = X$ %. Accordingly, X can be determined. The reason why the mixing ratios are finely distributed at intervals of 10% is to improve the measurement accuracy.

Incidentally, although the above method is for analysis method of the resin composition in the FRP layer 12, a similar analysis method can be used for the adhesive resin layer 13.

"Phenoxy resin" is a linear polymer obtained from a condensation reaction between a dihydric phenol compound and epihalohydrin or a polyaddition reaction between a dihydric phenol compound and a bifunctional epoxy resin, and is an amorphous thermoplastic resin. The phenoxy resin (A) can be obtained by a conventionally known method in a solution or without solvent, and can be used in any form of powder, varnish, and film. The average molecular weight of the phenoxy resin (A) is, for example, in the range of 10,000 or more and 200,000 or less as a weight average molecular weight (Mw), and preferably in the range of 20,000 or more and 100,000 or less, more preferably in the range of 30,000 or more and 80,000 or less. By setting the Mw of the phenoxy resin (A) to be in the range of 10,000 or more, the strength of the molded article can be increased. This effect is further enhanced by setting the Mw to 20,000 or more, and further to 30,000 or more. On the other hand, by setting the Mw of the phenoxy resin (A) to 200,000 or less, excellent usability and workability can be obtained. This effect is further enhanced by setting the Mw to 100,000 or less, and further to 80,000 or less.

Mw in the present specification is a value measured by gel permeation chromatography (GPC) and converted using a standard polystyrene calibration curve.

The hydroxyl equivalent (g/eq) of the phenoxy resin (A) used in the present embodiment is, for example, in the range of 50 or more and 1,000 or less, preferably in the range of 50 or more and 750 or less, and more preferably in the range of 50 or more and 500 or less. By setting the hydroxyl group equivalent of the phenoxy resin (A) to 50 or more, the number of hydroxyl groups decreases and the water absorption decreases, so that the mechanical properties of the cured product can be improved. On the other hand, by setting the hydroxyl equivalent of the phenoxy resin (A) to 1000 or less, it is possible to suppress a decrease in the number of hydroxyl groups, thereby improving the affinity with the adherend and improving the various mechanical properties of the metal-FRP composite body 1. This effect is further enhanced by setting the hydroxyl equivalent to 750 or less, or further 500 or less.

The glass transition temperature (Tg) of the phenoxy resin (A) is, for example, preferably in the range of 65° C. or higher and 150° C. or lower, and more preferably in the range of 70° C. or higher and 150° C. or lower. If the Tg is 65° C. or higher, the flowability of the resin can be suppressed from being too large while ensuring the moldability, so that the thickness of the adhesive resin layer 13 can be sufficiently ensured. On the other hand, if the Tg is 150° C. or lower, the melt viscosity becomes low, so that it becomes easy to impregnate the reinforcing fiber base material without defects such as voids, and a lower temperature bonding process can be performed. The Tg of the phenoxy resin (A) in the present specification is a numerical value calculated from a peak value in the second scanning, which is measured using a differential scanning calorimeter at a temperature rise of 10° C./min at a temperature within the range of 20 to 280° C.

The phenoxy resin (A) is not particularly limited as long as it satisfies the above-mentioned physical properties, but is preferably a bisphenol A-type phenoxy resin (for example, available as Phenotote YP-50, Phenotote YP-50S, and Phenotote YP-55U manufactured by Nippon Steel & Sumikin Chemical Co., Ltd.), bisphenol F type phenoxy resin (for example, available as Phenotote FX-316 manufactured by Nippon Steel & Sumikin Chemical Co., Ltd.), phenoxy resin derived from copolymerization of bisphenol A and bisphenol F (e.g., available as YP-70 manufactured by Nippon Steel & Sumikin Chemical Co., Ltd.), and special phenoxy resins such as brominated phenoxy resins, phosphorus-containing phenoxy resins, and sulfone group-containing phenoxy resins other than the phenoxy resins listed above (for example, available as phenothote YPB-43C, Phenotote FX293 and YPS-007, etc. manufactured by Nippon Steel & Sumikin Chemical Co., Ltd.) and the like. These resins can be used alone or in a mixture of two or more.

The resin composition may contain a thermoplastic resin or a thermosetting resin other than the phenoxy resin (A). The type of the thermoplastic resin is not particularly limited. For example, one or more selected from polyolefin and acid-modified products thereof, polystyrene, polymethyl methacrylate, AS resin, ABS resin, thermoplastic aromatic polyester such as polyethylene terephthalate and polybutylene terephthalate, polycarbonate, polyimide, polyamide, polyamide imide, polyether imide, polyether sulfone, polyphenylene ether and modified product thereof, polyphenylene sulfide, polyoxymethylene, polyarylate, polyether ketone, polyetherether ketone and polyetherketone ketone can be used. Further, as the thermosetting resin, for example, one or more selected from an epoxy resin, a vinyl ester resin, a phenol resin, and a urethane resin can be used.

The resin composition preferably has a melt viscosity of 3,000 Pa·s or less in any temperature range of 160 to 250° C., preferably has a melt viscosity in the range of 90 Pa·s or more and 2,900 Pa·s or less, more preferably has a melt viscosity in the range of 100 Pa·s or more and 2,800 Pa·s or less. By setting the melt viscosity in the temperature range of 160 to 250° C. to 3,000 Pa·s or less, the fluidity at the time of melting is improved, and defects such as voids are less likely to occur in the FRP layer 12. On the other hand, if the melt viscosity is 90 Pa·s or less, the molecular weight of the resin composition is too small, and if the molecular weight is too small, the resin composition becomes brittle and the mechanical strength of the metal-FRP composite body 1 decreases.

Crosslinkable Resin Composition

A crosslinkable resin composition (that is, a cured product of the resin composition) can also be prepared by blending, for example, an acid anhydride, isocyanate, caprolactam, or the like as a crosslinking agent into the resin composition containing the phenoxy resin (A). Since the heat resistance of the resin composition is improved by proceeding a crosslinking reaction using a secondary hydroxyl group contained in the phenoxy resin (A), the crosslinkable resin composition is advantageous for use in the member used in a higher temperature environment. For crosslinking formation using a secondary hydroxyl group of the phenoxy resin (A), it is preferable to use a crosslinkable resin composition in which a crosslinkable curable resin (B) and a crosslinking agent (C) are blended. As the crosslinkable curable resin (B), for example, an epoxy resin or the like can be used, but it is not particularly limited. By using such a crosslinkable resin composition, a cured product in a second cured state (crosslinked cured product) can be obtained in which the Tg of the resin composition is greatly improved as compared with the case of using the phenoxy resin (A) alone. The Tg of the crosslinked cured product of the crosslinkable resin composition is, for example, 160° C. or higher, preferably 170° C. or higher and 220° C. or lower.

In the crosslinkable resin composition, as the crosslinkable curable resin (B) mixed with the phenoxy resin (A), an epoxy resin having two or more functionalities is preferable. Bifunctional or higher functional epoxy resins include bisphenol A type epoxy resins (for example, available as Epototo YD-011, Epototo YD-7011 and Epototo YD-900 manufactured by Nippon Steel & Sumikin Chemical Co., Ltd.), bisphenol F type epoxy resins (for example, available as Epototo YDF-2001 manufactured by Nippon Steel & Sumikin Chemical Co., Ltd.,), diphenyl ether type epoxy resin (for example, available as YSLV-80DE manufactured by Nippon Steel & Sumikin Chemical Co., Ltd.), tetramethylbisphenol F type epoxy resin (for example, YSLV-80XY manufactured by Nippon Steel & Sumikin Chemical Co., Ltd.), bisphenol sulfide type epoxy resin (for example, available as YSLV-120TE manufactured by Nippon Steel & Sumikin Chemical Co., Ltd.), hydroquinone type epoxy resin (for example, available as Epototo YDC-1312 manufactured by Nippon Steel & Sumikin Chemical Co., Ltd.), phenol novolak type epoxy resin (for example, available as Epototo YDPN-638 manufactured by Nippon Steel & Sumikin Chemical Co., Ltd.,), ortho-cresol novolak type epoxy resin (for example, available as Epototo YDCN-701, Epototo YDCN-702, Epototo YDCN-703 and Epototo YDCN-704 manufactured by Nippon Steel & Sumikin Chemical Co., Ltd.), aralkyl naphthalene diol novolak type epoxy resin (for example, available as ESN-355 manufactured by Nippon Steel & Sumikin Chemical Co., Ltd.), and a triphenylmethane type epoxy resin (for example, available as EPPN-502H manufactured by Nippon Kayaku Co., Ltd.), but are not limited thereto. These epoxy resins may be used alone or in a mixture of two or more.

The crosslinkable curable resin (B) is not particularly limited, but is preferably a crystalline epoxy resin, and more preferably, a crystalline epoxy resin having a melting point in the range of 70° C. or higher and 145° C. and lower, and a melt viscosity at 150° C. of 2.0 Pa·s or less. By using a crystalline epoxy resin having such melting properties, the melt viscosity of the crosslinkable resin composition as the resin composition can be reduced, and the adhesiveness of the FRP layer 12 can be improved. If the melt viscosity exceeds 2.0 Pa·s, the moldability of the crosslinkable resin composition may decrease, and the homogeneity of the metal-FRP composite body 1 may decrease.

Examples of the crystalline epoxy resin suitable as the crosslinkable curable resin (B) include, for example, Epototo YSLV-80XY, YSLV-70XY, YSLV-120TE and YDC-1312 manufactured by Nippon Steel & Sumikin Chemical Co., Ltd., and YX-4000, YX-4000H, YX-8800, YL-6121H and YL-6640, etc. manufactured by Mitsubishi Chemical Corporation, HP-4032, HP-4032D and HP-4700, etc., manufactured by DIC Corporation, and NC-3000, etc. manufactured by Nippon Kayaku Co., Ltd.

The crosslinking agent (C) crosslinks the phenoxy resin (A) three-dimensionally by forming an ester bond with the secondary hydroxyl group of the phenoxy resin (A). Therefore, unlike strong crosslinking such as curing of a thermosetting resin, the crosslinking can be released by a hydrolysis reaction, so that the metal member 11 and the adhesive resin layer 13, and the FRP layer 12 can be easily separated. Accordingly, the metal member 11 can be recycled.

As the crosslinking agent (C), an acid anhydride is preferably used. The acid anhydride is not particularly limited as long as it is solid at an ordinary temperature and does not have much sublimability. However, from the viewpoint of imparting heat resistance to the metal-FRP composite body 1 and reactivity, aromatic acid dianhydrides having two or more acid anhydrides which react with the hydroxyl group of the phenoxy resin (A) are preferred. In particular, aromatic compounds having two acid anhydride groups, such as pyromellitic anhydride, are preferably used because the crosslink density becomes higher and the heat resistance is improved as compared with the combination of trimellitic anhydride and hydroxyl groups. Among aromatic acid dianhydrides, aromatic acid dianhydrides compatible with a phenoxy resin or an epoxy resin, for example, 4,4'-oxydiphthalic acid, ethylene glycol bisanhydrotrimellitate, and 4,4'-(4,4'-isopropylidene diphenoxy)diphthalic anhydride are more preferable because they have an effect of improving Tg. In particular, an aromatic acid dianhydride having two acid anhydride groups such as pyromellitic anhydride is preferably used because it enhances crosslink density and enhances heat resistance as compared to phthalic anhydride having only one acid anhydride group. That is, an aromatic acid dianhydride has good reactivity because it has two acid anhydride groups, a crosslinked cured product having sufficient strength for demolding can be obtained in a short molding time, and the final crosslink density can be increased, because four carboxyl groups are formed by an esterification reaction with the secondary hydroxyl group in the phenoxy resin (A).

The reaction of the phenoxy resin (A), the epoxy resin as the crosslinkable curable resin (B) and the crosslinking agent (C) is based on an esterification reaction between the secondary hydroxyl group in the phenoxy resin (A) and the acid anhydride group of the crosslinking agent (C), and a reaction between carboxyl group formed by the above esterification reaction and the epoxy group of the epoxy resin, and as a result, crosslinking and curing of the resin occurs. Although a crosslinked phenoxy resin can be obtained by the reaction between the phenoxy resin (A) and the crosslinking agent (C), the melt viscosity of the adhesive resin composition can be reduced by the coexistence of the epoxy resin. As a result, excellent properties such as improved impregnation with the adherend (the metal member 11 and the adhesive resin layer 13), acceleration of the crosslinking reaction, improvement of the crosslink density, and improvement of the mechanical strength can be achieved.

In the crosslinkable resin composition, although an epoxy resin as a crosslinkable curable resin (B) coexists, a phenoxy resin (A) which is a thermoplastic resin is a main component and it is considered that the esterification reaction between the secondary hydroxyl group of the phenoxy resin (A) and the acid anhydride group of the crosslinking agent (C) preferentially occurs. That is, the reaction between the acid anhydride used as the crosslinking agent (C) and the epoxy resin used as the crosslinkable curable resin (B) takes longer time (its reaction speed is slower). Accordingly, the reaction between the crosslinking agent (C) and the secondary hydroxyl group of the phenoxy resin (A) occurs first, and then the crosslinking agent (C) remained in the previous reaction or the residual carboxyl group derived from the crosslinking agent (C) reacts with the epoxy resin to further enhance the crosslink density. Therefore, unlike a resin composition containing an epoxy resin which is a thermosetting resin as a main component, a crosslinked cured product obtained by using a crosslinkable resin composition is a thermoplastic resin and has excellent storage stability.

In the crosslinkable resin composition utilizing the crosslinking of the phenoxy resin (A), it is preferable that the crosslinkable curable resin (B) is contained in the range of 5 parts by mass or more and 85 parts by mass or less with respect to 100 parts by mass of the phenoxy resin (A). The content of the crosslinkable curable resin (B) relative to 100 parts by mass of the phenoxy resin (A) is more preferably in the range of 9 parts by mass or more and 83 parts by mass or less, and still more preferably 10 parts by mass or more and 80 parts by mass or less. By setting the content of the crosslinkable curable resin (B) to 85 parts by mass or less, the curing time of the crosslinkable curable resin (B) can be shortened, so that the strength required for demolding can be easily obtained in a short time, and the recyclability of the FRP layer 12 is improved. This effect is further enhanced by setting the content of the crosslinkable curable resin (B) to 83 parts by mass or less, and more preferably 80 parts by mass or less. On the other hand, when the content of the crosslinkable curable resin (B) is 5 parts by mass or more, the effect of improving the crosslink density due to the addition of the crosslinkable curable resin (B) is easily obtained, and the crosslinked product of the crosslinkable adhesive resin composition easily develops Tg of 160° C. or higher, and the fluidity is improved. Incidentally, the content of the crosslinkable curable resin (B) is measured in the same manner for the peak derived from the epoxy resin by the method using IR as described above.

The mixing amount of the crosslinking agent (C) is usually in the range of 0.6 mol or more and 1.3 mol or less of the acid anhydride group per 1 mol of the secondary hydroxyl group of the phenoxy resin (A), preferably is in the range of 0.7 mol or more and 1.3 mol or less, more preferably in the range of 1.1 mol or more and 1.3 mol or less. When the amount of the acid anhydride group is 0.6 mol or more, the crosslink density will be high, resulting in excellent mechanical properties and heat resistance. This effect is further enhanced by setting the amount of the acid anhydride group to 0.7 mol or more, and further to 1.1 mol or more. When the amount of the acid anhydride group is 1.3 mol or less, it is possible to suppress unreacted acid anhydride and carboxyl group from adversely affecting the curing characteristics and the crosslink density. Therefore, it is preferable to adjust the mixing amount of the crosslinkable curable resin (B) depending on the mixing amount of the crosslinking agent (C). Specifically, for example, a carboxyl group formed by a reaction between a secondary hydroxyl group of the phenoxy resin (A) and an acid anhydride group of the crosslinking agent (C) is reacted with an epoxy resin used as the crosslinkable curable resin (B). For this purpose, the mixing amount of the epoxy resin is preferably in the range of 0.5 mol or more and 1.2 mol or less with respect to 1 mol of the crosslinking agent (C). The mixing ratio of the epoxy resin is preferably in the range of 0.7 mol or more and 1.0 mol or less with respect to 1 mol of the crosslinking agent (C).

When the crosslinking agent (C) is blended with the phenoxy resin (A) and the crosslinkable curable resin (B), a crosslinkable resin composition can be obtained. However, an accelerator (D) as a catalyst may be further added to ensure that the cross-linking reaction proceeds. The accelerator (D) is not particularly limited as long as it is a solid at ordinary temperature and has no sublimability. For example, it includes a tertiary amine such as triethylenediamine; imidazoles such as 2-methylimidazole, 2-phenylimidazole and 2-phenyl-4-methylimidazole; organic phosphines such as triphenylphosphine; and tetraphenylboron salts such as tetraphenylphosphonium tetraphenylborate. One type of these accelerators (D) may be used alone, or two or more types may be used in combination. When the accelerator (D) is used, it is preferable that the mixing amount of the accelerator (D) is in the range of 0.1 parts by mass or more and 5 parts by mass or more with respect to 100 parts by mass of the total amount of the phenoxy resin (A), the crosslinkable curable resin (B) and the crosslinking agent (C).

The crosslinkable resin composition is solid at an ordinary temperature, and its melt viscosity is as follows. The minimum melt viscosity, i.e. the lower limit of the melt viscosity in the temperature range of 160 to 250° C. is preferably not more than 3,000 Pa·s, more preferably 2,900 Pa·s or less, and still more preferably 2,800 Pa·s or less. By setting the minimum melt viscosity in the temperature range of 160 to 250° C. to 3,000 Pa·s or less, the crosslinkable resin composition can be sufficiently impregnated into the adherend at the time of heat compression by hot press or the like. Since the occurrence of defects such as voids in the FRP layer 12 can be suppressed, the various mechanical properties of the metal-FRP composite body 1 are improved. This effect is further enhanced by setting the minimum melt viscosity in the temperature range of 160 to 250° C. to 2,900 Pa·s or less, and further 2,800 Pa·s or less.

The above resin compositions for forming the matrix resin 101 (including crosslinkable resin compositions) may comprise for example, natural rubbers, synthetic rubbers, elastomers, various inorganic fillers, solvents, extender pigments, colorants, antioxidants, UV inhibitors, flame retardants, flame retardant auxiliaries and other additives, as long as they do not impair the adhesiveness or physical properties.

As described above, an oil film may be formed on the surface of the metal member 11. It may be difficult to bond the FRP and the metal member 11 with a sufficient bonding strength when an attempt is made to bond the FRP and the metal member 11 while such an oil film is formed on the surface of the metal member 11. As one of measures against such a problem, there is a method of degreasing the surface of the metal member 11 as described above. Further, as another method, there is a method of adding an oil-surface bonding adhesive to the adhesive resin composition.

Here, the oil-surface bonding adhesive is an adhesive that exhibits adhesiveness to an adherend on which an oil film is formed. The oil-surface bonding adhesive is also referred to as an oil-absorbing adhesive or the like, and contains a component having a high affinity for an oil component. That is, when the oil-surface bonding adhesive is applied to the adherend, the oil-surface bonding adhesive closely adheres to the adherend while absorbing oil on the surface of the adherend. Various types of oil-surface bonding adhesives are commercially available, and in the present embodiment, a commercially available oil-surface bonding adhesive can be used without any particular limitation. That is, when the metal member 11 on which the oil film is formed and the FRP in which an oil-surface bonding adhesive is added are bonded, the metal-FRP composite body 1 showing the super-addition rule (super-law-of-mixture) may be produced. In this case, this adhesive is said to be an oil-surface bonding adhesive suitable for the present embodiment. Examples of the oil-surface bonding adhesive include Alphatech 370 (epoxy-based oil-surface bonding adhesive) manufactured by Alpha Kogyo Co., Ltd., Penguin cement 1066 (epoxy-based oil-surface bonding adhesive) manufacturing by Sunstar Engineering and Devcon PW1 (methacrylate-based oil-surface bonding adhesive) manufactured by Devcon Corporation. One type of oil-surface bonding adhesive may be used alone, or a mixture of a plurality of types of oil-surface bonding adhesives may be used.

The mixing amount of the oil-surface bonding adhesive into the matrix resin 101 may be adjusted so that the metal-FRP composite body 1 shows the super-law-of-mixture. For example, it may be more than 0 parts by mass and 50 parts by mass or less with respect to 100 parts by mass of the resin component.

In addition, an oil-surface bonding adhesive may be applied to the interface between the adhesive resin layer 13 and the metal member 11 to adhere them to each other. That is, an oil-surface bonding adhesive may be applied to at least one of the surfaces of the adhesive resin layer 13 and the metal member 11 to adhere them to each other. The specific coating amount may be adjusted so that the metal-FRP composite body 1 exhibits the super-law-of-mixture. As an example, the coating amount may be 10 to 500 μm thick. The coating method is not particularly limited, and examples thereof include roll coating, bar coating, spraying, dipping, and application using a brush.

As described above, as a countermeasure when an oil film is formed on the surface of the metal member 11, a method of performing degreasing, a method of adding an oil-surface bonding adhesive to the adhesive resin composition, a method of applying an oil-surface bonding adhesive to the interface between the metal member 11 and the adhesive layer 13 may be mentioned. Any one of these may be performed or two or more thereof may be used in combination. As described above, when the metal member 11 is a hot-dip galvanized steel sheet, an electro-galvanized steel sheet, or an aluminum-plated steel sheet, an oil film is often formed on the surface of the metal member 11. Therefore, when the metal member 11 is made of such a steel plate, it is preferable to consider taking measures against the oil film.

As above, the FRP layer 12 according to the present embodiment has been described in detail.

(Adhesive Resin Layer 13)

The adhesive resin layer 13 is interposed between the metal member 11 and the FRP layer 12 of the metal-FRP composite body 1 to bond the metal member 11 and the FRP layer 12. The adhesive resin layer 13 is formed between the surface of the metal member 11 and the FRP layer 12.

In the resin component of the adhesive resin layer 13, the concentration of the phenoxy resin as described above is lower than the concentration of the phenoxy resin in the resin component of the matrix resin 101 of the FRP layer 12. The concentration of the phenoxy resin in the resin component of the adhesive resin layer 13 is preferably 0 part by mass or more and less than 50 parts by mass with respect to 100 parts by mass of the resin component.

In the resin component of the adhesive resin layer 13, when the concentration of the phenoxy resin is equal to or higher than the concentration of the phenoxy resin in the resin component of the matrix resin 101 of the FRP layer 12, the matrix resin of the FRP layer 12 and the adhesive resin layer 13 are composed of the same type of resin. In such a case, when the FRP layer 12 (or the FRP prepreg that will later be the FRP layer 12) and the metal member 11 are thermocompression bonded via the adhesive sheet that will later be the adhesive resin layer 13, the matrix resin 101 and the adhesive resin layer 13 are composed of the same type of resin composition, the matrix resin 101 and the adhesive resin layer 13 result in being mixed with each other. As a result, there is a high possibility that the reinforcing fiber material 102 in the FRP layer 12 penetrates the matrix resin 101 and reaches the inside of the adhesive resin layer 13, and further, the reinforcing fiber material 102 penetrates the adhesive resin layer 13. Then, there is a high possibility that electrolytic corrosion will occur.

On the other hand, when the concentration of the phenoxy resin in the resin component of the adhesive resin layer 13 is lower than the concentration of the phenoxy resin in the resin component of the matrix resin 101 as in the present embodiment, mixing of the reinforcing fiber materials 102 as described above can be effectively suppressed to prevent the occurrence of electrolytic corrosion. Further, when the resin composition constituting the adhesive resin layer 13 and the resin composition constituting the matrix resin 101 of the FRP layer 12 are not the same type of resin (that is, the main components of the resin compositions are different from each other), the mixing of the matrix resin 101 and the adhesive resin layer 13 can be more reliably suppressed. Therefore, the occurrence of electrolytic corrosion can be more reliably prevented.

The adhesive resin layer 13 may be a solidified product or a cured product obtained by combining one or a plurality of thermosetting resins, or a solidified product or a cured product obtained by combining one or a plurality of thermoplastic resins. Further, the adhesive resin layer 13 may be a crosslinked cured product obtained by crosslinking a thermoplastic resin and a thermosetting resin. However, by using a thermoplastic resin as the main component of the adhesive resin layer 13, a bonding step that is necessary in the case where a thermosetting resin is used can be omitted when the metal-FRP composite body 1 is manufactured. Further, when a thermoplastic resin is used, it is possible to simultaneously perform warm molding and bonding by applying a processing method such as hot pressing. Therefore, the adhesive resin layer 13 contains a thermoplastic resin as a main component.

Further, when a thermoplastic resin is used as the main component of the adhesive resin layer 13, it becomes possible to form a composite with the metal member 11 by thermocompression bonding by hot pressing as described above. By omitting the required curing time, the metal member 11 and the fiber-reinforced resin material can be instantly bonded and composited. Furthermore, when a thermoplastic resin is used as the main component of the adhesive resin layer 13, it becomes possible to include the internal stress due to thermocompression bonding in the fiber-reinforced resin, and it is also effective to exhibit the expression of the super-law-of-mixture as described in detail below, which is preferable.

The type of the thermoplastic resin is not particularly limited, and for example, one or more selected from phenoxy resin, polyolefin and acid-modified products thereof, polystyrene, polymethylmethacrylate, AS resin, ABS resin, polyester such as polyethylene terephthalate and polybutylene terephthalate, polyvinyl chloride, acrylic, polycarbonate, super engineering plastics such as polyamide, polyether sulfone, polyphenylene ether and modified products thereof, polyimide, polyamideimide, polyetherimide, polyetheretherketone, polyphenylenesulfide, polyoxymethylene, polyarylate, polyetherketone, polyetherketone ketone, nylon and the like can be used.

When a thermoplastic resin is used as the main component of the adhesive resin layer 13, the resin composition constituting the adhesive resin layer 13 preferably has a dynamic viscoelasticity (more specifically, storage elastic modulus E') as described in detail below. Hereinafter, the condition regarding the storage elastic modulus E' will be described in detail.

No substance actually exists which has an ideal state such as a completely elastic body or a completely viscous body, and the elastic modulus of all substances can be expressed by a combination of elastic and viscous terms. Further, such viscoelasticity can be considered not only for a substance in a solid state but also for a substance in a liquid state. When an external force is applied to a substance, the energy of the external force is divided into an amount stored by the elastic term of the substance and an amount lost by the viscous term of the substance. The elastic modulus related to the energy of the external force stored by the substance is called the storage elastic modulus E', and the elastic modulus related to the energy of the external force consumed by the substance is called the loss elastic modulus E". The storage elastic modulus E' can also be considered as the elastic modulus indicating the reaction force from the substance when an external force is applied to the substance, and it can be judged that the higher the storage elastic modulus E', the "harder" the substance is. The unit of the storage elastic modulus E' and the loss elastic modulus E" is Pa.

Figure 4A:
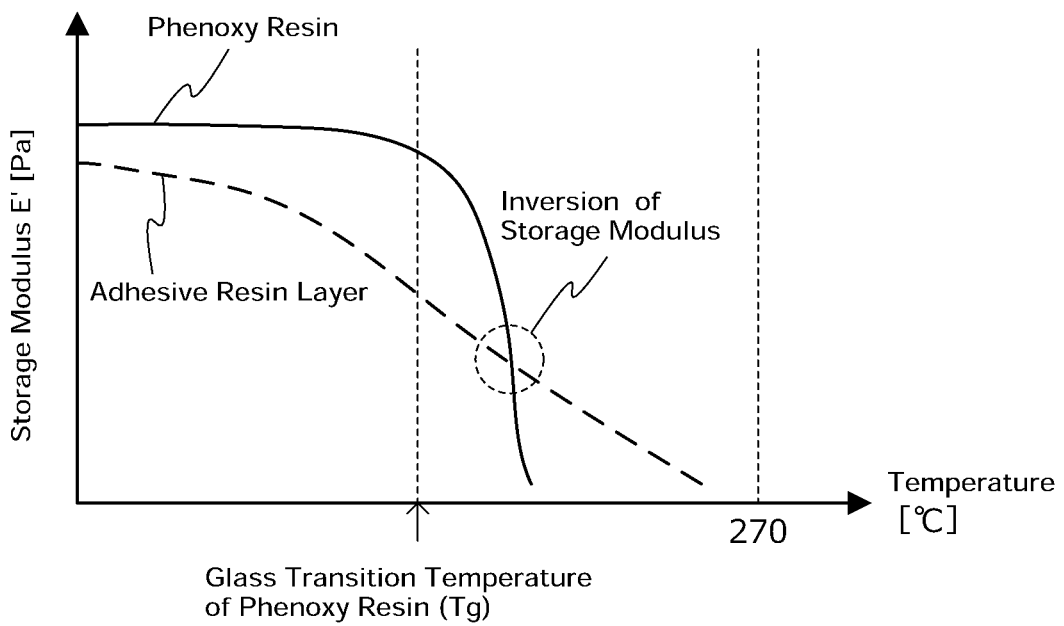
FIG. 4A is an explanatory diagram schematically showing a storage elastic modulus of an adhesive resin layer.
Figure 4B:
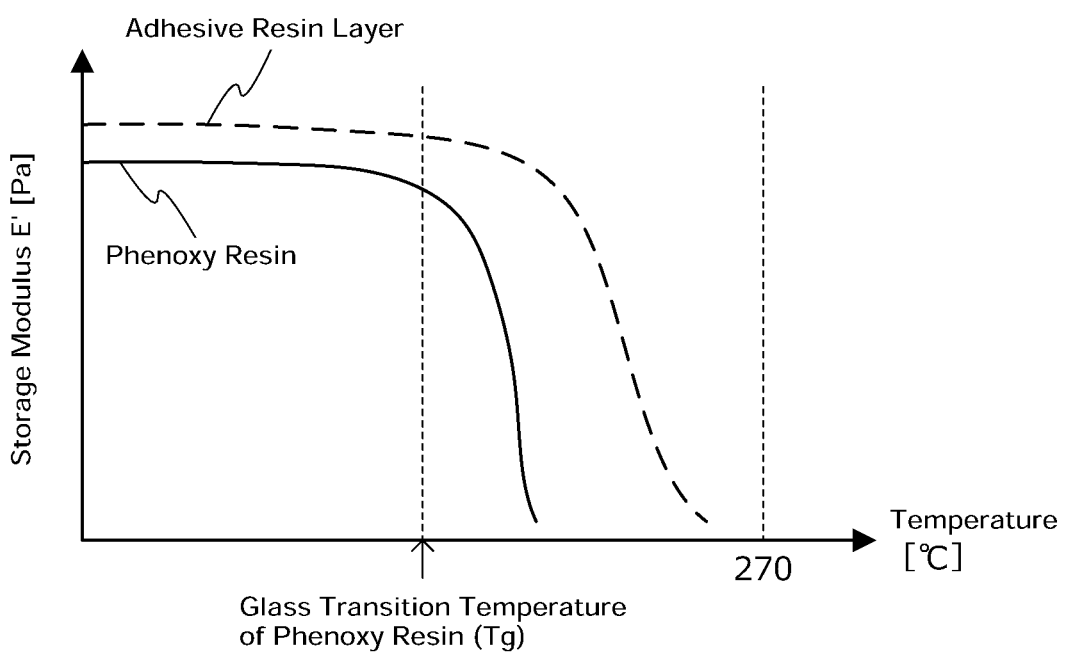
FIG. 4B is an explanatory diagram schematically showing a storage elastic modulus of an adhesive resin layer.

FIGS. 4A and 4B are explanatory diagram schematically showing the storage elastic modulus of the adhesive resin layer. Regarding the storage elastic modulus E' as described above, the resin composition constituting the adhesive resin layer 13 and the phenoxy resin constituting the matrix resin 101 of the FRP layer 12 are compared. In order to prevent the occurrence of electrolytic corrosion in the metal-FRP composite body 1, as described above, it is important to prevent the matrix resin 101 of the FRP layer 12 and the adhesive resin layer 13 from being mixed with each other. For that purpose, it is preferable to realize a situation in which the matrix resin 101 cannot penetrate into the adhesive resin layer 13 during the thermocompression bonding process for producing the metal-FRP composite body 1. Here, the resin composition constituting the adhesive resin layer 13 preferably satisfies the following conditions in a temperature range not lower than the glass transition temperature of the phenoxy resin and not higher than the processing temperature at which the thermocompression bonding treatment is performed. As shown in FIG. 4A, the storage elastic modulus E' of the resin composition constituting the adhesive resin layer 13 is higher than the storage elastic modulus E' of the phenoxy resin, or, as shown in FIG. 4B, the storage elastic modulus E' of the resin composition constituting the adhesive resin layer 13 is always higher than the storage elastic modulus E' of the phenoxy resin.

In the thermocompression bonding process for producing the metal-FRP composite body 1, the processing temperature is often set to 270° C. or lower. Therefore, in FIGS. 4A and 4B, the region of the temperature of 270° C. or lower is schematically illustrated.

As described above, the high value of the storage elastic modulus E' indicates that the substance is hard. When the phenoxy resin and the resin composition constituting the adhesive resin layer 13 are compared, if the storage elastic modulus E' of the resin composition constituting the adhesive resin layer 13 is higher, the resin composition constituting the resin layer 13 is in a harder state than the phenoxy resin. In this case, the phenoxy resin which is in a relatively soft state is effectively suppressed from entering the adhesive resin layer 13 which is in a relatively hard state.

Here, as shown in FIG. 4A, regarding the phenoxy resin and the resin composition constituting the adhesive resin layer 13, if there is a temperature at which their storage elastic moduluses E's are inversed to each other, it is possible to effectively suppress the mixture of the matrix resin 101 of the FRP layer 12 and the adhesive resin layer 13 by performing the thermocompression bonding process at a temperature or higher wherein the inversion of their storage elastic moduluses E's occurs.

As a result of examination by the present inventors, it became clear that, among the thermoplastic resins usable as the main component of the adhesive resin layer 13, polypropylene, nylon, polyester terephthalate, polybutylene terephthalate, polymethylpentene, polyethylene and the like exhibit a behavior of the storage elastic modulus E' as shown in FIG. 4A, and polycarbonate, polyphenylene sulfide, polyether ether ketone, polyether sulfone and the like exhibit a behavior of the storage elastic modulus E' as shown in FIG. 4B.

The behavior of the storage elastic modulus E' as schematically shown in FIGS. 4A and 4B is identified by measuring a DTMA (Derivative TMA) of a substance of interest using a thermomechanical analysis (TMA) device in accordance with JIS K7244.

Moreover, in order to more reliably prevent mechanical contact between the reinforcing fiber material 102 in the FRP layer 12 and the metal member 11, and to more reliably prevent intrusion of a conductive substance that causes electrolytic corrosion, the thickness of the adhesive resin layer 13 is preferably 10 μm or more. When the thickness of the adhesive resin layer 13 is less than 10 μm, a conductive substance that causes electrolytic corrosion may enter the interface between the metal member 11 and the FRP layer 12. On the other hand, when the thickness of the adhesive resin layer 13 exceeds 50% of the thickness of the FRP layer 12, the thick adhesive resin layer 13 is interposed between the FRP layer 12 and the metal member 11, it may not be possible to utilize the excellent performance of FRP.

As above, the adhesive resin layer 13 according to the present embodiment has been described in detail.

Incidentally, in the adhesive resin layer 13 according to the present embodiment, other additives such as, for example, natural rubber, synthetic rubber, elastomers, various inorganic fillers, solvents, extender pigments, colorants, an antioxidant, an ultraviolet ray inhibitor, a flame retardant, and a flame retardant aid, etc. within a range that does not impair the adhesiveness and physical properties may be blended. Further, the adhesive resin layer 13 may contain an oil-surface bonding adhesive.

As described below, the adhesive resin layer 13 is formed by, for example, disposing a resin sheet or applying a resin composition between the precursor of the FRP layer 12 and the metal member 11. In this case, an oil-surface bonding adhesive may be added to the resin sheet or the coating liquid. The blending amount of the oil-surface bonding adhesive may be determined by the same method as described above.

In addition, an oil-surface bonding adhesive may be applied to the interface between the adhesive resin layer 13 and the metal member 11 to bond them. The coating method is not particularly limited, and examples thereof include roll coating, bar coating, spraying, dipping and coating using a brush. When the adhesive resin layer 13 is formed from a resin sheet, an oil-surface bonding adhesive may be applied to the surface of the resin sheet on the metal member 11 side or the surface of the metal member 11 to bond them. When the adhesive resin layer 13 is formed by applying a resin composition, an oil-surface bonding adhesive may be applied to the surface of the metal member 11 or the FRP (or prepreg) on the side where the resin composition is not applied to bond them. The specific coating amount may be adjusted so that the metal-FRP composite body 1 exhibits the super-law-of-mixture. As an example, the coating amount may be 10 to 500 μm thick.

As described above, as a countermeasure when the oil film is formed on the surface of the metal member 11, a method of performing degreasing treatment, a method of blending an oil-surface bonding adhesive with a resin composition for forming the matrix resin 101, or a method of applying an oil-surface bonding adhesive to the interface between the metal member 11 and the adhesive resin layer 13 can be mentioned. Any one of these may be used, or two or more thereof may be used in combination. As described above, when the metal member 11 is a hot dip galvanized steel sheet, an electrogalvanized steel sheet or an aluminum plated steel sheet, an oil film is often formed on the surface of the metal member 11. Therefore, when the metal member 11 is made of these steel plates, it is preferable to consider taking the above oil film countermeasure.

(Shear Strength between Metal Member and FRP Layer)

In the metal-FRP composite body 1 according to the present embodiment, the shear strength between the metal member 11 and the FRP layer 12 is 0.8 MPa or more. When the shear strength is 0.8 MPa or more, the metal-FRP composite body 1 can maintain sufficient mechanical strength and exhibits excellent durability. The higher the shear strength between the metal member 11 and the FRP layer 12, the greater the effect obtained by the super-law-of-mixture described later, and the better the physical properties of the metal-FRP composite body. Therefore, the shear strength is preferably 1.0 MPa or more, and more preferably 4.0 MPa or more. Incidentally, the shear strength in the present embodiment is a value measured by a shear test described later. A value of 0.8 MPa corresponds to 40 N/5 mm, a value of 1.0 MPa corresponds to 50 N/5 mm, and a value of 4.0 MPa corresponds to 200 N/5 mm.

The shear strength as described above can be measured by referring to the tensile shear adhesive strength test method for adhesives specified in JIS K 6850:1999.

Figure 5:
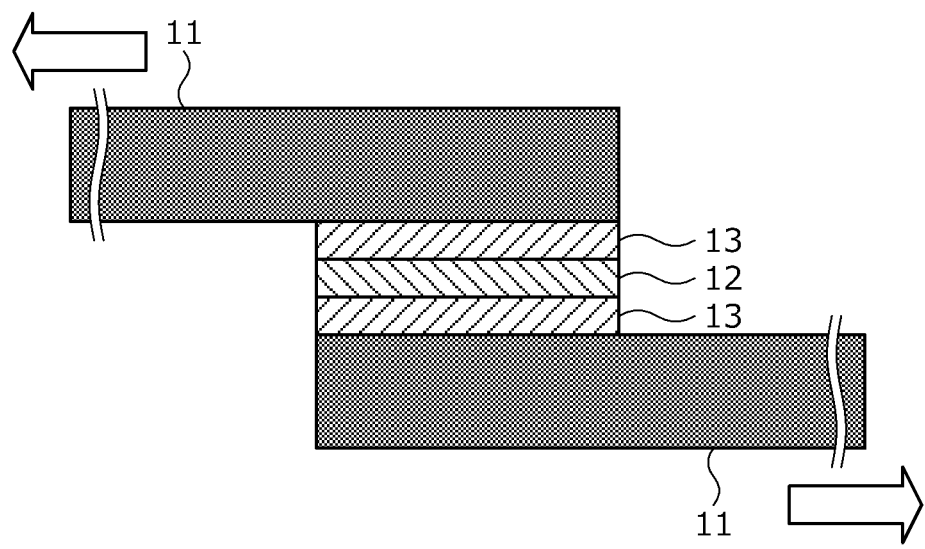
FIG. 5 is an explanatory diagram schematically showing a method for measuring shear strength of a metal-fiber reinforced resin material composite body.

That is, as shown in FIG. 5, two metal members 11 processed into a size of width 5 mm×length 60 mm are prepared, and the FRP laminate (adhesive resin layer 13/FRP layer 12/adhesive resin layer 13 are laminated in this order) is disposed on the portion 10 mm from the edge of each of the metal member 11, and thermocompression bonding is performed under desired conditions to prepare a sample of the metal-FRP composite body for shear test. That is, a sample of the metal-FRP composite body for shear test is produced by sandwiching the FRP laminate between the portions near the edge of the upper and lower two metal members 11 and thermocompression bonding under desired conditions. Shear strength can be measured by applying a tensile load to the obtained sample of the metal-FRP composite body for shear test in the directions shown in FIG. 5 and measuring the behavior thereof.

For example, the tensile shear adhesive strength test is performed on the test piece thus produced, at a speed (stroke speed) of 0.15 mm/min by applying a tensile load. If the load is 40 N, since the adhesion area is 5 mm in width×10 mm in length, the load divided by the area becomes 40÷50 N/mm² (40 N/5 mm in other notation), which is 0.8 MPa. Here, the test results are shown when the width of the test piece is 5 mm. However, if the test results vary significantly, the measurement may be stabilized by adjusting the width of the test piece to about 25 mm with reference to the method described in JIS K 6850:1999 in order to improve the variation.

(About Super-Law-of-Mixture)

Figure 9:
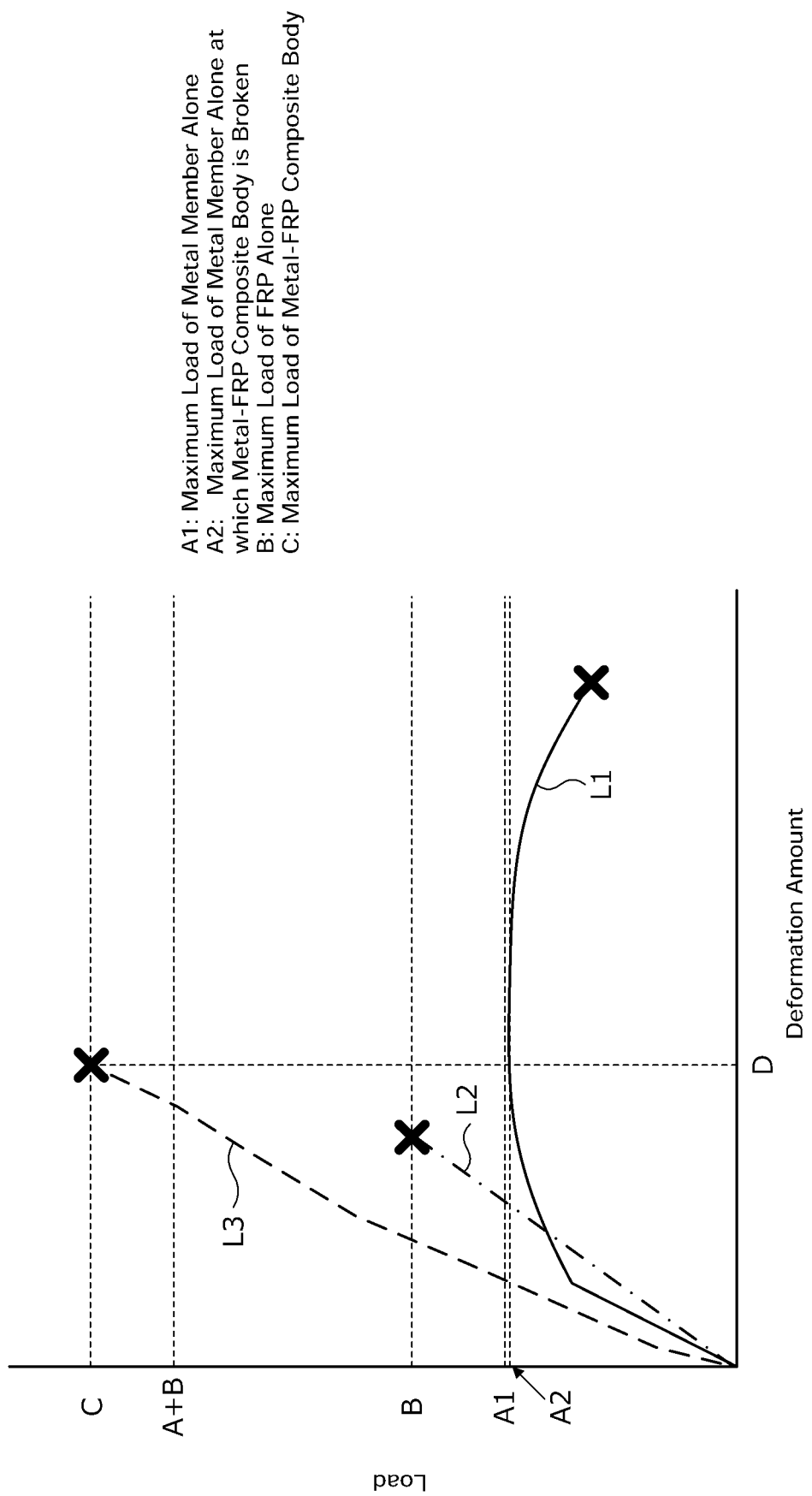
FIG. 9 is a graph schematically showing the result of the tensile test of each test piece.

The maximum load of the metal-FRP composite body 1 according to the present embodiment indicates an excellent strength exceeding law of mixture, that is, super-law-of-mixture. Here, the super-law-of-mixture in the present embodiment will be described with reference to FIG. 9. FIG. 9 is a graph schematically showing the results of measuring the tensile load of the metal member 11 alone, the tensile load of the FRP alone, and the tensile load of the metal-FRP composite 1. Here, it is assumed that the measurement of the tensile load is performed by a method described in Examples described later. The horizontal axis in FIG. 11 indicates the amount of deformation of the test specimen, and the vertical axis indicates the tensile load.

The graph L1 shows the correlation between the deformation amount and the tensile load of the metal member 11 alone, wherein the load A1 shows the maximum load (the maximum value of the tensile load) of the metal member alone. The load A2 indicates a tensile load of the metal member 11 at a deformation amount D described later. The mark x in the graph L1 indicates the deformation amount and the tensile load when the metal member 11 was broken. The graph L2 shows the correlation between the deformation amount and the tensile load of FRP alone, wherein the load B shows the maximum load (the maximum value of the tensile load) of FRP alone. The mark x in the graph L2 indicates that the FRP was broken. The graph L3 shows the correlation between the deformation amount and the tensile load of the metal-FRP composite body 1, wherein the load C shows the maximum load (the maximum value of the tensile load) of the metal-FRP composite body 1. The mark x in the graph L3 indicates that the metal-FRP composite body 1 was broken, and the deformation D indicates the deformation (elongation) amount of the metal-FRP composite body 1 when the metal-FRP composite body 1 was broken.

The super-law-of-mixture in the present embodiment means that Formula (2-2) among Formulae (2-1) and (2-2) described below is satisfied.

$$C > A1 + B \qquad (2\text{-}1)$$

$$C > A2 + B \qquad (2\text{-}2)$$

That is, the determination of yes or no of the super-law-of-mixture may be made based on whether or not Formula (2-2) is satisfied. Here, since the load A1 is larger than the load A2, if Formula (2-1) is satisfied, Formula (2-2) is naturally satisfied. Therefore, when Formula (2-1) is satisfied, it is possible to determine that the super-law-of-mixture is satisfied.

In the case of a metal of $A1 \gg A2$, such as a high tensile steel, Formula (2-2) is satisfied, while Formula (2-1) is often not satisfied. It is possible to judge whether or not the super-law-of-mixture is satisfied based on only Formula (2.2). However, for example, in the case of a metal in which the load A1 and the load A2 are close to each other, such as when soft steel is used (for example, when $A1/A2 < 1.1$, (FIG. 9 is an example thereof)), the load A1 may be easier to measure. In this case, it is easier to determine the super-law-of-mixture based on Formula (2-1). At this time, it is determined that the super-law-of-mixture is satisfied if Formula (2-2) is satisfied, even if Formula (2-1) is not satisfied.

If the load C is substantially equal to the total load of the load A1 and the load B, then $A1 > A2$ and thus the super-law-of-mixture is satisfied. As shown in a comparative examples described later, in a metal-FRP composite body that does not satisfy the requirements of the present embodiment, the load C may be lower than the total load of the loads A2 and B.

Here, the ratio of the load C to the total load of the load A2 and the load B ($=C/(A2+B)$) is defined as a degree of the super-law-of-mixture. In the present embodiment, a degree of the super-law-of-mixture exceeds 1.00. A degree of the super-law-of-mixture is preferably 1.01 or more, more preferably 1.05 or more. Here, in the determination of the satisfaction of the super-law-of-mixture described above, in the case of a metal such as soft steel in which the load A1 and the load A2 are close to each other, it can be easily determined by using Formula (2-1). However, it is preferable that a degree of the super-law-of-mixture is calculated by $C/(A2+B)$.

(About Formula (1))

In order for the metal-FRP composite body 1 to exhibit the super-law-of-mixture, it is needed that the metal member 11 and the FRP layer 12 have the above-described configuration, for example, and that satisfy the following Formula (1)

$$(T1 \times E1)/(T2 \times E2) > 0.3 \qquad \text{Formula (1)}$$

In Formula (1), T1 is the total thickness of the metal member 11, E1 is the elastic coefficient of the metal member 11, T2 is the total thickness of the FRP layer 12 and the adhesive resin layer 13, and E2 is the elastic coefficient of the FRP layer 12 and the adhesive resin layer 13. The elastic coefficient in the present embodiment means a tensile modulus (Young modulus) at a room temperature (25° C.). Therefore, T1 and E1 are parameters related to the metal member 11, and T2 and E2 are parameters related to the FRP layer 12 and the adhesive resin layer 13. T1 is defined as "the total thickness of the metal member 11" because the metal-FRP composite body 1 may be manufactured using a plurality of metal members 11, such as in the case wherein the FRP layer 12 is sandwiched between a plurality of metal members 11. Further, the elastic coefficient E2 may be calculated according to the law of mixture. For example, if the FRP layer 12 is A and the adhesive resin layer 13 is B, the elastic coefficient E2 is calculated by (elastic coefficient of A×thickness of A/total thickness T2 of FRP layer 12 and adhesive resin layer 13)+(elastic coefficient of B×thickness of B/total thickness T2 of FRP layer 12 and adhesive resin layer 13). Here, it is not necessary to consider the elastic coefficient of the adhesive resin layer 13 in the elastic coefficient E2. This is because the tensile strengths of the FRP layer 12 and the adhesive resin layer 13 substantially depend on the FRP layer 12 (and more specifically, depend on the reinforcing fiber material 102 in the FRP layer 12).

Further, the adhesive resin layer 13 may be very thin compared to the thickness of the FRP layer 12 in some cases. In these cases, T2 may be regarded as only the thickness of the FRP layer 12. That is, the thickness of the adhesive resin layer 13 may be ignored. For example, when the thickness of the adhesive resin layer 13 is 5 μm or less with respect to the thickness of the FRP layer 12, the thickness of the adhesive resin layer 13 may be ignored. When a plurality of types of metal members 11 are stacked, E1 is calculated according to the law of mixture. For example, when the metal member 11 is composed of A, B, . . . , then E1 is calculated by (elastic coefficient of A×thickness of A/total thickness T1 of the plurality of metal members)+(elastic coefficient of B×thickness of B/total thickness T1 of the plurality of metal members) . . . . Similarly, when a plurality of types of FRP layers 12 are stacked, E2 is calculated according to the law of mixture. For example, assuming that the plurality of FRP layers 12 are A, B, C . . . , E2 is calculated by (elastic coefficient of A×thickness of A/total thickness T2 of the plurality of FRP layers)+(elastic coefficient of B×thickness of B/total thickness T2 of the plurality of FRP layers) . . . . Note that the elastic coefficient of the FRP layer 12 may be the elastic coefficient of the reinforcing fiber material 102 constituting the FRP layer 12.

The maximum load of the metal-FRP composite body 1 that satisfies Formula (1) indicates an excellent strength exceeding the law of mixture, i.e., the super-law-of-mixture.

The reason is presumed as follows. The metal-FRP composite body 1 has a metal member 11, an FRP layer 12, and an adhesive resin layer 13 interposed therebetween. The FRP layer 12 has brittleness, but the metal member 11 has ductility and a large elastic coefficient E1. Here, since the adhesive resin layer 13 contains the phenoxy resin (A) having excellent adhesiveness to the metal member 11, the metal member 11 and the FRP layer 12 are firmly bonded by the adhesive resin layer 13. Therefore, when a large tensile load is applied to the metal-FRP composite body 1, the fracture of the FRP layer 12 (having brittleness) can be suppressed by the action of the metal member 11 (having ductility and a large elastic coefficient E1). Therefore, it is considered that the metal-FRP composite body 1 delays brittle fracture and has higher strength when compared with the metal member 11 alone or the FRP layer 12 alone under the same total thickness conditions.

The metal member 11 and the adhesive resin constituting the adhesive resin layer 13 have different coefficients of thermal expansion, and the metal member 11 has a larger amount of change due to heat. Therefore, when the metal-FRP composite body 1 is molded at a high temperature and then cooled in the manufacturing process, the FRP layer 12 and the resin layer 101 follow the metal member 11 having a large expansion and contraction. Therefore, they are fixed under the compressive force (internal stress) to a certain extent from the beginning. When a tensile load is applied to the metal-FRP composite body 1, the FRP layer 12 and the adhesive resin layer 13 in the compressed state have a larger elongation margin than in the non-compressed state, and their fracture will be delayed by that much. As a result, it is considered that the entire metal-FRP composite body 1 can exhibit high tensile strength. Such an effect can be obtained more effectively when the elastic coefficient E1 of the metal member 11 is larger. That is, when the elastic coefficient E1 of the metal member 11 increases, the tensile load per unit elongation of the metal-FRP composite body 1 increases. As described above, the elongation margin is increased by the internal stress. Therefore, as the elastic coefficient E1 of the metal member 11 is larger, the tensile load corresponding to this margin (the tensile load required to extend the metal-FRP composite body 1 by the above-mentioned margin) increases. Therefore, the metal-FRP composite body 1 can withstand higher tensile loads.

Here, Formula (1) as described above is derived by the following experiment.

That is, for many samples in which the thickness and the elastic coefficient of the metal member and the thickness and the elastic coefficient of the FRP were changed, whether or not the strength exceeding the law of mixture was obtained was verified by experiments, and the verification results (whether or not the strength exceeding the law of mixture was obtained) by each of samples were plotted on a coordinate plane having a horizontal axis representing the thickness of FRP and vertical axis representing the thickness of the metal member. Then, a straight line representing the boundary of the region where the strength exceeding the law of mixture is obtained is derived from the results indicated as an approximate curve by a known statistical analysis process. According to Formula (1) as described above, for example, when the elastic coefficient E2 of the FRP layer 12 is fixed and if the elastic coefficient E1 of the metal member 11 is high, an excellent strength exceeding the law of mixture can be realized, even if the total thickness T1 of the metal member 11 is reduced. Conversely, if the elastic coefficient E1 of the metal member 11 is low, the total thickness T1 of the metal member 11 will be increased in order to realize an excellent strength exceeding the law of mixture.

For the above reasons, as the metal-FRP composite body 1 satisfying the above Formula (1), one in which a material of the metal member 11 is iron (steel material, iron-based alloy, etc.) is preferable. Since iron has a large elastic coefficient E1 of about 200 GPa and has toughness, an excellent strength can be maintained even when the thickness T1 is low. In addition, as a material of the metal member 11, although not as good as iron, titanium (about 105 GPa) and aluminum (about 70 GPa) having a large elastic coefficient E1 are preferably used.

The thicknesses of the metal member 11, the FRP layer 12 and the adhesive resin layer 13 can be measured in accordance with the cross-sectional method of the optical method described in JIS K 5600-1-7, 5.4 as follows. That is, using an ordinary temperature curable resin that can be embedded without gaps and without adversely affecting the sample, using a low-viscosity epomount 27-777 manufactured by Refinetech Co., Ltd. as a main component and 27-772 as a curing agent, the sample is embedded. The sample is cut in the direction parallel to its thickness direction to expose its cross-section at a place to be observed by a cutting machine, and an observation surface of the sample is prepared by polishing the exposed surface with polishing paper of a count specified by JIS R #6252 or 6253 (for example, 280 count, 400 count or 600 count). When an abrasive material is used to create the observation surface, it is polished with an appropriate grade of diamond paste or similar paste. In addition, buffing may be performed as necessary to smooth the surface of the sample to a state that can be suited for observation.

Figure 6:
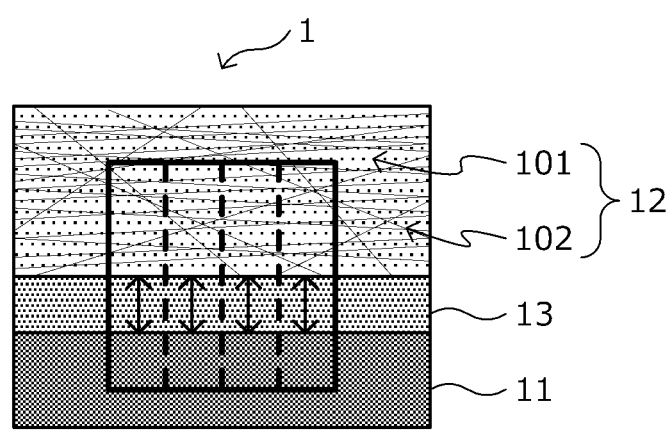
FIG. 6 is an explanatory diagram for explaining a thickness measuring method.

A microscope equipped with an appropriate illumination system to give an optimal image contrast, and capable of measuring with an accuracy of 1 μm (for example, BX51 manufactured by Olympus Corporation) is used and the size of its visual field is selected to set 300 μm. Here, the size of the visual field may be changed so that the respective thickness can be confirmed (for example, if the thickness of the FRP layer 12 is 1 mm, the size of the visual field may be changed to confirm the thickness). For example, when measuring the thickness of the adhesive resin layer 13, the observation visual field is divided into four equal parts as shown in FIG. 6, and the thickness of the adhesive resin layer 13 is measured at the center in the width direction of each dividing point. The average thickness is the thickness in the visual field. This observation visual field is measured by selecting five different locations, dividing the observation visual field into four equal parts, measuring the thickness of each part, and calculating the average value of the measurements. For adjacent observation visual fields, they should be selected at a distance of 3 cm or more. The value obtained by further averaging the average values at these five points may be used as the thickness of the adhesive resin layer 13. Further, the measurement of the thickness of the metal member 11 or the FRP layer 12 may be performed in the same manner as the measurement of the thickness of the adhesive resin layer 13.

When the boundary surfaces of the metal member 11, the FRP layer 12, and the adhesive resin layer 13 are relatively clear, the thickness of the adhesive resin layer 13 can be measured by the above method. However, the boundary between the FRP layer 12 and the adhesive resin layer 13 is not always clear. When the boundary surface is not clear, the boundary surface may be specified by the following method. That is, the metal-FRP composite body 1 is scraped off from the metal member 11 side using a grinder or the like to which a diamond grindstone is attached. Then, the cut surface is observed with the above-mentioned microscope, and the area ratio of the fiber portion constituting the reinforcing fiber material 102 (the area ratio of the fiber portion to the total area of the observation visual field) is measured. The area ratio may be measured in a plurality of observation visual fields, and the arithmetic average value thereof may be used as the area ratio of the fiber portion. Then, the cut surface when the area ratio of the fiber portion exceeds 10% may be used as a boundary surface between the FRP layer 12 and the adhesive resin layer 13.

(About Preferable Range of (T1×E1)/(T2×E2))

Figure 10:
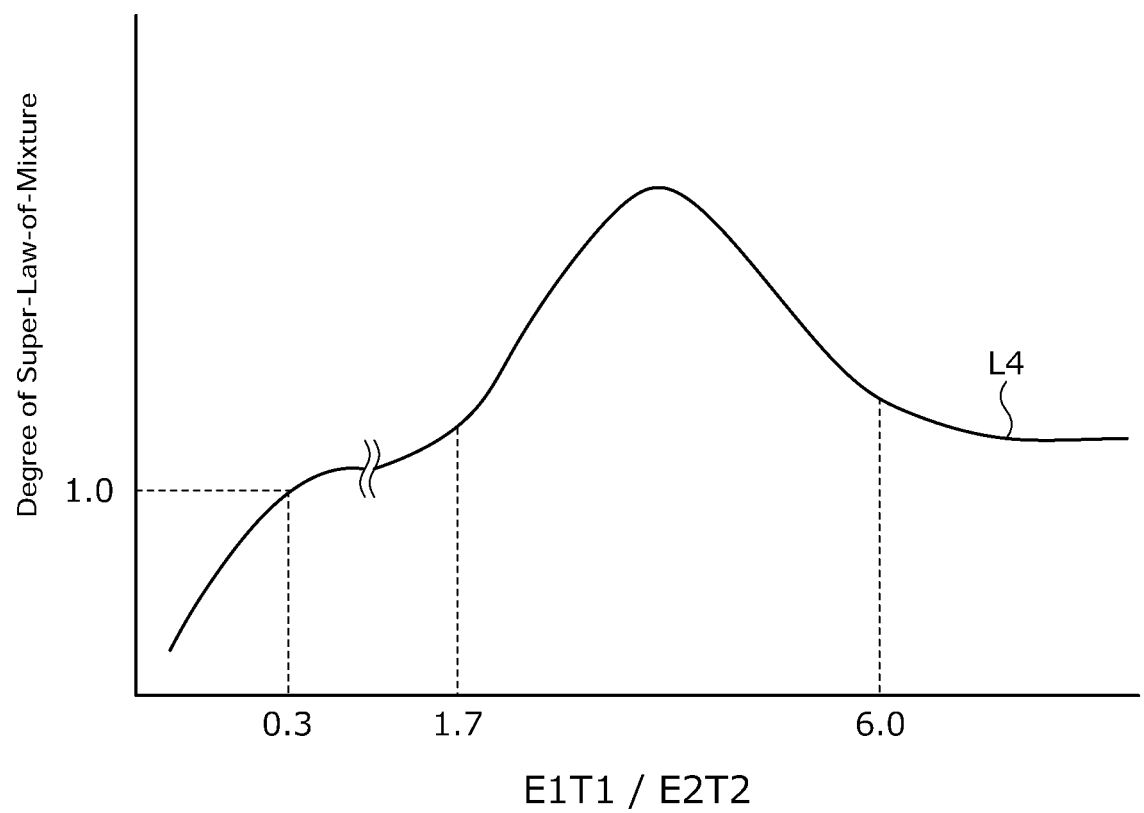
FIG. 10 is a graph schematically showing a preferable range of $(T1 \times E1)/(T2 \times E2)$.

As described above, a degree of the super-law-of-mixture is preferably 1.01 or more, and more preferably 1.05 or more. In other words, it can be said that the larger a degree of the super-law-of-mixture, the better. Here, the present inventors examined in detail the results of the below-described examples (examples in which the metal-FRP composite body 1 was manufactured under various manufacturing conditions and their characteristics were evaluated), and it became clear that there is a correlation between (T1×E1)/(T2×E2) and a degree of the super-law-of-mixture. Since the manufacturing conditions of each of Examples are various, it is not possible to simply compare degrees of the super-law-of-mixture in each of Examples. Therefore, the present inventors estimated the degree of the super-law-of-mixture when the manufacturing conditions were leveled, and plotted the result on the coordinate plane indicating (T1×E1)/(T2×E2) on the horizontal axis and a degree of the super-law-of-mixture on the vertical axis to obtain graph L4 shown in FIG. 10. According to the graph L4, when (T1×E1)/(T2×E2) is 0.3, a degree of super-law-of-mixture becomes 1.00, and when (T1×E1)/(T2×E2) is larger than 0.3 (that is, when Formula (1) is satisfied), a degree of the super-law-of-mixture exceeds 1.00. Further, when (T1×E1)/(T2×E2) is in the range of 1.7 to 6.0, a degree of the super-law-of-mixture has a local maximum value. Therefore, it is understood that the preferable lower limit of (T1×E1)/(T2×E2) is 1.7 or more, and the preferable upper limit is 6.0 or less. When (T1×E1)/(T2×E2) is a value within this range, a degree of the super-law-of-mixture is a value of 1.01 or more, and further, a value of 1.05 or more. A more preferred lower limit is 2.5 or more, and a more preferred upper limit is 3.0 or less. This is because when (T1×E1)/(T2×E2) is 2.5 or more and 3.0 or less, a degree of the super-law-of-mixture becomes a local maximum value or a value closer to the local maximum value. The local maximum value may be larger than 1.05, for example, about 1.3.

<Method for Producing Metal-fiber Reinforced Resin Material Composite Body>

Figure 7:
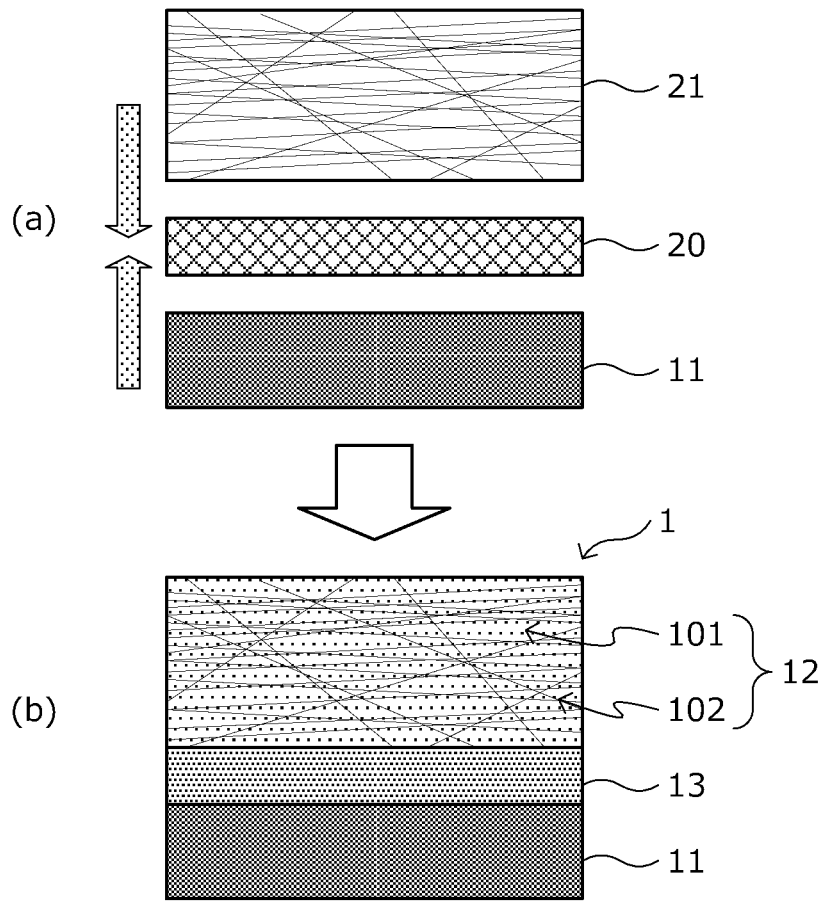
FIG. 7 is an explanatory diagram for explaining a method for manufacturing the metal-fiber reinforced resin material composite body according to the embodiment.

Next, the method for producing the metal-FRP composite body according to the present embodiment will be described in detail with reference to FIG. 7. FIG. 7 is an explanatory diagram for explaining the method for producing the metal-FRP composite body according to the present embodiment.

In the method for producing the metal-FRP composite body 1 according to the present embodiment, (a) a fiber-reinforced resin material or a fiber reinforced material prepreg comprising a reinforcing fiber base material made of the reinforcing fiber material and a matrix resin or a matrix resin in a first cured state impregnated in the reinforcing fiber base material and containing 50 parts by mass or more of the phenoxy resin with respect to 100 parts by mass of the resin component, and a resin sheet made of a resin component (hereinafter, also referred to as "adhesive resin composition") of which the concentration of the phenoxy resin is lower than the concentration of the phenoxy resin in the resin component of the matrix resin are respectively prepared, and (b) a metal member, the resin sheet, and the fiber-reinforced resin material or the fiber-reinforced resin material prepreg are sequentially stacked to form a stack, and (c) heating and pressure bonding of the stack are performed to form a composite body. Alternatively, if the matrix resin is a resin which is heat-curable, the resin constituting the matrix resin is changed from the first cured state to the second cured state, and the glass transition temperature of the resin constituting the matrix resin is changed, causing the stack to be pressure-bonded to form a composite body. This makes it possible to obtain a metal-fiber reinforced resin material composite body in which the shear strength between the metal member and the fiber-reinforced resin material is 0.8 MPa or more. Incidentally, the shear strength between the metal member 11 and the FRP layer 12 can be improved by increasing the heating temperature, increasing the pressure for pressure bonding, or lengthening the time for heat pressure bonding. A shear strength of 0.8 MPa or more can be obtained by appropriately adjusting the heating temperature, the pressure at the time of pressure bonding, and the time of heat pressure bonding.

More specifically, for example, as shown in FIG. 7(*a*), an adhesive sheet 20 made of an adhesive resin composition in the form of a film, and an FRP molding prepreg 21 which will later become an FRP layer 12 are provided on at least one surface of the metal member 11 to form a stack in which the metal member 11, the adhesive sheet 20, and the FRP molding prepreg 21 are stacked in this order. In FIG. 7(*a*), instead of the FRP molding prepreg 21, FRP can be laminated, but at this case, the bonding surface of the FRP is preferably activated by being roughened by blasting or the like, plasma treatment, corona treatment, or the like. Next, by heating and pressing this stack, a metal-FRP composite body 1 is obtained as shown in FIG. 7(*b*).

In such a method, in FIG. 7(*a*), the adhesive sheet 20 and the FRP molding prepreg 21 (or FRP) may be laminated on both surfaces of the metal member 11, respectively. Further, the FRP molding prepreg 21 (or FRP) which will later become FRP layer 12 is not limited to one layer, and may be a plurality of layers (see FIG. 2). In addition, the adhesive sheet 20 and the FRP prepreg 21 (or FRP) which will become FRP layer 12 are laminated using two or more metal members 11 so as to sandwich them therebetween.

(Composite Formation with Metal Member)

Composite formation of the metal member 11 and the FRP is preferably performed, for example, as follows.

Namely, the adhesive resin sheet 20 which will later be the adhesive resin layer 13 is placed at a predetermined position on the bonding surface of the metal member 11. Next, a laminate in which the FRP molding prepregs 21 which will later be the FRP layers 12 is laminated thereon is placed in a pressure molding machine, and pressure molded to form the adhesive resin layer 13.

(Thermocompression Bonding Conditions)

In the above method, the thermocompression bonding conditions for forming a composite of the metal member 11, the adhesive sheet 20, and the FRP molding prepreg 21 (or FRP) which will later be FRP layer 12 are as follows.

The thermocompression bonding temperature is not particularly limited, but is, for example, in the range of 100° C. or more and 400° C. or less, preferably 150° C. or more and 300° C. or less, more preferably in the range of 160° C. or more and 270° C. or less, and further preferably in the range of 180° C. or more and 250° C. or less. Within such a range, more preferably, the thermocompression bonding temperature is determined while also considering the behavior of the storage elastic modulus E' as shown in FIGS. 4A and 4B. If it exceeds the upper limit temperature as described above, decomposition of the resin may occur because excessive heat is added, and if it is less than the lower limit temperature as described above, the melt viscosity of the resin is high. As a result, the adhesion to the reinforcing fiber material and the impregnation to the reinforcing fiber base material may be deteriorated.

The pressure at the time of thermocompression bonding is, for example, preferably 3 MPa or more, and more preferably in the range of 3 MPa or more and 5 MPa or less. If the pressure exceeds the upper limit, an excessive pressure is applied, which may cause deformation or damage. If the pressure is lower than the lower limit, the impregnating property to the reinforcing fiber base material is deteriorated.

About the thermocompression bonding time, the thermocompression bonding can be sufficiently performed if it is done for at least 3 minutes or more, and it is preferable that it is done for 5 minutes or more and 20 minutes or less.

In the thermocompression bonding step, the composite batch molding of the metal member 11, the adhesive sheet 20, and the FRP molding prepreg 21 (or FRP) which will later be FRP layer 12 may be performed by a pressure molding machine. The composite batch molding is preferably performed by a hot press, but the material preheated to a predetermined temperature may be promptly disposed in a low-temperature press molding machine for processing.

By performing the above-mentioned thermocompression bonding process, the FRP layer 12 can be bonded to the metal member 11 in a state where a compressive force (internal stress) is applied to the FRP layer 12 and the adhesive resin layer 13, and thus the super-law-of-mixture as described above can be exhibited.

(Additional Heating Step)

In the above method, as the raw material resin for forming the matrix resin 101, a crosslinkable adhesive resin composition comprising a crosslinkable curable resin (B) and a crosslinking agent (C) in addition to the phenoxy resin (A) is used, and an additional heating step may be further included.

When the crosslinkable adhesive resin composition is used, by using a cured product in the first cured state (solidified product) which is solidified but not crosslinked (cured) as a raw material resin of the matrix resin of the FRP molding prepreg 21 which will later be the FRP layer 12 in the above-mentioned thermocompression bonding step, the FRP layer 12 including the matrix resin 101 made of the cured product in the first cured state (solidified product) can be formed.

As described above, the metal member 11, the adhesive resin layer 13, and the FRP layer 12 made of the cured product in the first cured state (solidified product) are laminated and integrated to form an intermediate (preform) of metal-FRP composite body 1 via the above-described thermocompression bonding process. Then, by performing an additional heating step on the intermediate body after the thermocompression bonding step, post-curing is performed on at least the FRP layer 12 made of the cured product in the first cured state (solidified product). As a result, the resin can be crosslinked and cured to be a cured product in the second cured state (cross-linked cured product).

The additional heating step for post-curing is preferably performed, for example, at a temperature in the range of 200° C. or more and 250° C. or less for about 30 minutes to 60 minutes. Note that, instead of the post-curing, a thermal hysteresis in a post process such as painting may be used.

As described above, when the crosslinkable adhesive resin composition is used, Tg after crosslinking and curing is greatly improved as compared with the phenoxy resin (A) alone. Therefore, before and after the additional heating step is performed on the above-mentioned intermediate, that is, in the process that the resin changes from a cured product in the first cured state (solidified product) to a cured product in the second cured state (crosslinked cured product), Tg changes. Specifically, the Tg of the resin before crosslinking in the intermediate is, for example, 150° C. or less, whereas the Tg of the crosslinked resin after the additional heating step is, for example, 160° C. or more, preferably 170° C. or more and 220° C. or lower, and thus the heat resistance can be significantly increased.

(Pretreatment Step)

When the metal-FRP composite body 1 is manufactured, as a pretreatment step of bonding the metal member 11 and the FRP with the adhesive resin composition, the metal member 11 is preferably degreased. It is more preferable to perform release treatment to mold or remove the attached matter on the surface of the metal member 11 (dust removal). Except for a steel plate having a very high adhesion such as TFS (Tin Free Steel), it is difficult for the metal member 11 such as a steel plate to which rustproof oil or the like is adhered to obtain a strength exceeding the above-described law of mixture unless its adhesion is restored by degreasing. Therefore, by performing the above pretreatment on the metal member 11, the metal-FRP composite body 1 may easily obtain a strength exceeding the law of mixture. Regarding the necessity of degreasing, it is sufficient to check and judge whether or not a laminate actually exhibits the super-law-of-mixture, wherein the laminate comprises the target metal member preliminarily bonded and integrated with the target FRP with the target adhesive resin composition without degreasing step. Regarding the judgement whether or not the super-law-of-mixture is exhibited will be described later in the [Confirmation of Presence or Absence of Super-law-of-mixture]. As described above, in addition to or instead of the degreasing treatment, the oil-surface bonding adhesive may be added to the adhesive resin composition or the oil-surface bonding adhesive may be applied to the interface between the adhesive resin layer 13 and the metal member 11.

(Post-Step)

In the post-step for the metal-FRP composite body 1, in addition to painting, drilling for mechanical bonding with other members such as bolting and riveting, and application of an adhesive for adhesive bonding, and the like are performed.

(About Manufacturing Method of FRP or FRP Molding Prepreg)

Here, a method of manufacturing the FRP or the FRP molding prepreg 21 which is used when forming the FRP layer 12 will be described.

In the FRP or FRP molding prepreg 21 used when forming the FRP layer 12, for example, a non-woven fabric base material using chopped fibers, a cloth material using continuous fibers, or a unidirectional reinforcing fiber base material (UD material) or the like can be used for the reinforcing fiber base material serving as the reinforcing fiber material. However, from the viewpoint of the reinforcing effect, use of a cloth material or a UD material is preferable.

For the FRP or FRP forming prepreg 21, it is preferable to use a prepreg prepared by a powder coating method, rather than a prepreg prepared by a conventionally known method such as a wet melt or a film stack method. The prepreg made by the powder coating method has a good drapability because the resin in the form of fine particles is impregnated into the reinforcing fiber base material, and can follow an adherend even when the adherend has a complicated shape. Therefore, it is suitable for batch molding hot press.

As a main method of the powder coating method, for example, there are an electrostatic coating method, a fluidized bed method, a suspension method, and the like. Depending on the type of the reinforcing fiber base material or the type of the matrix resin, any method may be appropriately selected. Among them, the electrostatic coating method and the fluidized bed method are methods suitable for thermoplastic resins, and are preferable because the process is simple and the productivity is good. In particular, the electrostatic coating method is the most preferable method because it is excellent in uniformity of adhesion of the adhesive resin composition to the reinforcing fiber base material.

When a powder coating of the adhesive resin composition which will later be the matrix resin is performed for forming the FRP or FRP forming prepreg 21, it is preferred to obtain a prepreg by making the adhesive resin composition containing the phenoxy resin (A) described above as a fine powder, and adhering the fine powder to a reinforcing fiber base material by powder coating.

For pulverization of the adhesive resin composition containing the phenoxy resin (A), for example, a pulverizer/mixer such as a low-temperature dry pulverizer (Centry Dry Mill) can be used, but is not limited thereto. When the adhesive resin composition for the matrix resin is pulverized, the components of the adhesive resin composition may be pulverized and then mixed, or the components may be mixed in advance and then pulverized. In this case, it is preferable to set the pulverization conditions such that each fine powder has an average particle diameter described later. The fine powder thus obtained has an average particle diameter in the range of 10 μm or more and 100 μm or less, preferably in the range of 40 μm or more and 80 μm or less, and more preferably in the range of 40 μm or more and 50 μm or less. When the average particle diameter is 100 μm or less, the energy when the adhesive resin composition collides with the fibers in powder coating under an electrostatic field can be reduced, and the ratio of adhesion to the reinforcing fiber base material can be increased. In addition, by setting the average particle diameter to 10 μm or more, it is possible to prevent particles due to an entrained air flow from scattering and to suppress a decrease in adhesion efficiency, and to prevent resin fine powder floating in the air from deteriorating the working environment.

When performing powder coating of a crosslinkable adhesive resin composition in which a crosslinkable curable resin (B) and a crosslinking agent (C) are blended with a phenoxy resin (A) as an adhesive resin composition for forming the FRP or FRP forming prepreg 21, the average particle diameters of the fine powder of the phenoxy resin (A) and the fine powder of the crosslinkable curable resin (B) are preferably in the range of 1 to 1.5 times the average particle diameter of the fine powder of the crosslinking agent (C). By setting the particle diameter of the fine powder of the crosslinking agent (C) to be equal to or less than the particle diameters of the fine powder of the phenoxy resin (A) and the crosslinkable curable resin (B), the crosslinking agent (C) can reach the inside of the reinforcing fiber base material and adhere to the reinforcing fiber material. In addition, since the crosslinking agent (C) is present evenly around the particles of the phenoxy resin (A) and the particles of the crosslinkable curable resin (B), the crosslinking reaction can reliably proceed.

In the powder coating for forming the FRP or FRP forming prepreg 21, it is preferable to perform the powder coating such that the adhesion amount (resin content: RC) of the adhesive resin composition which will later be the matrix resin to the reinforcing fiber base material is, for example, in the range of 20% or more and 50% or less. RC is more preferably in the range of 25% or more and 45% or less, and even more preferably in the range of 25% or more and 40% or less. By setting the RC to 50% or less, it is possible to prevent the mechanical properties such as the tensile and flexural modulus of the FRP from lowering. In addition, by setting the RC to 20% or more, the necessary amount of the resin adhered can be secured, so that the matrix resin is sufficiently impregnated into the inside of the reinforcing fiber base material, and the thermophysical properties and mechanical properties can be improved.

The fine powder of the powder-coated adhesive resin composition (which will later be the matrix resin) is fixed to the reinforcing fiber base material by heating and melting. In this case, the powder may be applied to the reinforcing fiber base material and then heat-fused, or may be fused at the same time of coating the pre-heated reinforcing fiber base material with the fine powder of the adhesive resin composition. In this way, by heating and melting the fine powder of the adhesive resin composition on the surface of the reinforcing fiber base material, the adhesion to the reinforcing fiber base material can be increased, and the fine powder of the coated adhesive resin composition can be prevented from being falling off. However, at this stage, the adhesive resin composition which will later be the matrix resin is concentrated on the surface of the reinforcing fiber base material, and does not reach the inside of the reinforcing fiber base material as in the molded article after the heat and pressure molding. Incidentally, the heating time for fusing the adhesive resin composition after powder coating is not particularly limited, but is usually 1 to 2 minutes. The melting temperature is in the range of 150 to 240° C., preferably in the range of 160 to 220° C., more preferably in the range of 180 to 200° C. If the melting temperature exceeds the upper limit, the curing reaction may proceed, and if the melting temperature is lower than the lower limit, the heat fusion becomes insufficient, and during handling work, fall off or, drop out or etc. of the fine powder of the adhesive resin composition may occur.

Here, an oil-surface bonding adhesive may be added to the adhesive resin composition. Although the specific method of addition is not particularly limited, for example, the following method may be mentioned. When the oil-surface bonding adhesive is a liquid, the adhesive resin composition is finely cut, pulverized, and mixed with the oil-surface bonding adhesive. Using the mixture as a raw material, the same process as in the above-described production method may be performed. As a method of cutting and pulverizing, the above-mentioned pulverization method may be used. When the oil-surface bonding adhesive is solid, the oil-surface bonding adhesive is dissolved in an organic solvent, the resulting solution is mixed with the adhesive resin composition, and the organic solvent is volatilized and dried. Using this as a raw material, the same steps as in the above-described production method may be performed. Further, the same steps as in the above-described production method may be performed using a mixture as a raw material obtained by physically cutting, pulverizing, and mixing the oil-surface bonding adhesive and the adhesive resin composition with a stirrer or the like.

As above, the method for manufacturing the metal-FRP composite body 1 according to the present embodiment has been described above in detail.

As described above, according to the present embodiment, the metal-FRP composite body 1 in which the metal member 11 and the fiber-reinforced resin material (FRP layer 12) are firmly joined by the adhesive resin layer 13 is provided. The metal-FRP composite body 1 is lightweight and excellent in workability and can be manufactured by a simple method. For example, even if the metal member 11 is a steel material that has been subjected to a rust-proof treatment, the metal member 11 and the fiber-reinforced resin material (FRP layer 12) have a high bonding strength without performing a special surface roughening treatment. Further, when the metal member 11 and the fiber-reinforced resin material (FRP layer 12) are composited, the manufacturing cost can be reduced because formation of the composite can be collectively processed with the molding of the metal member 11 by hot pressing at the same time. Therefore, the metal-FRP composite body 1 of the above-mentioned embodiment can be suitably used as a lightweight and high-strength material, not only for a casing of electric/electronic devices but also for a structural member in applications such as automobile members and aircraft members. Furthermore, since the metal-FRP composite body 1 can solve all the above-mentioned six problems when the FRP is used for an automobile member, it can be particularly preferably used as an automobile member.

EXAMPLES

The present invention will be described more specifically with reference to the following examples, but the present invention is not limited to these examples. Incidentally, the test and the measuring method of various physical properties in these Examples are as follows.

[Average Particle Diameter (D50)]

The average particle diameter was measured by a laser diffraction/scattering type particle size distribution measuring device (Microtrack MT3300EX, manufactured by Nikkiso Co., Ltd.) when the cumulative volume became 50% on a volume basis.

[Melt Viscosity]

Using a rheometer (manufactured by Anton Paar), a sample having a size of 4.3 cm³ was sandwiched between parallel plates, and the temperature was raised at 20° C./min, the melt viscosity was measured at a frequency of 1 Hz and at a load strain of 5% at 180° C.

[Resin Content (RC:%)]

It was calculated from the weight (W1) of the reinforcing fiber base material before the application of the matrix resin and the weight (W2) of the FRP molding material after the application of the resin using the following formula.

$$\text{Resin content } (RC:\%) = (W2 - W1)/W2 \times 100$$

W1: Weight of reinforcing fiber base material before application of resin
W2: Weight of FRP molding material after application of resin

[Measurement of Thickness of FRP Layer and Adhesive Resin Layer]

The thickness of the FRP layer and the adhesive resin layer were measured by the method mentioned earlier.

[Measurement of Shear Strength]

The shear strength between the metal member 11 and the FRP layer 12 was measured by the method mentioned previously. Further, for those having a weak adhesion such that the shear strength could not be measured, it was meaningless to evaluate, and therefore the tensile test as described below was not carried out.

[Measurement of Tensile Strength and Tensile Modulus (Elastic Coefficient)]

JIS K 7164: 2005 The mechanical properties (tensile strength and tensile modulus) of the metal-FRP composite obtained according to the test conditions for isotropic and orthotropic fiber-reinforced plastics were measured. The tensile load is obtained by multiplying the tensile strength by the cross-sectional area of the test specimen (tensile strength (N/mm²)=tensile load (N)/cross-sectional area of test specimen (mm²)). The dimensions of the test specimens were 200 mm×25 mm.

Figure 8:
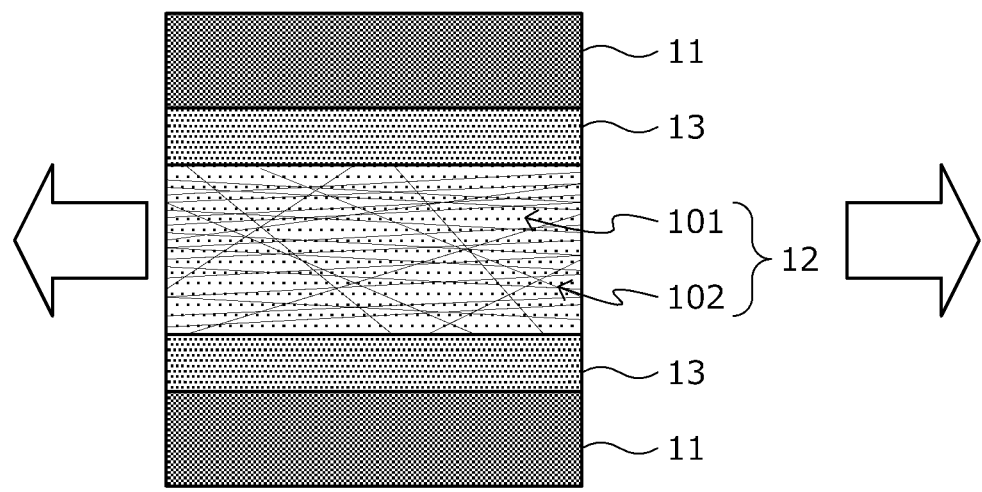
FIG. 8 is an explanatory diagram showing a configuration of a sample of the metal-FRP composite body for tensile test in Examples and Comparative Examples.

Here, as schematically shown in FIG. 8, the metal members 11 are arranged on both sides of the FRP laminate in which the adhesive resin layers 13 were laminated on both sides of the FRP layer 12. A sample of a metal-FRP composite body for a tensile test was obtained by thermocompression bonding under the conditions shown in each of Examples and Comparative Examples. The direction of the arrow in FIG. 8 indicates the direction in which the load is applied.

[Confirmation of Presence or Absence of Super-Law-of-Mixture]

Confirmation of whether or not the super-law-of-mixture was expressed was performed as follows. The metal member 11 and the FRP layer 12 (here, the prepreg before the FRP layer 12 is integrated with the metal member 11) are individually subjected to a tensile test by the above-described measurement method, and the maximum load (load A1, B) is measured. Next, the tensile test is performed also on the metal-FRP composite body in which the metal member 11 and the FRP layer 12 are formed into a composite body by the above-described measurement method, and the maximum load (load C) is measured. Further, based on the deformation amount D when the load C is measured (the deformation amount of the metal-FRP composite body at break) and based on the result of the tensile test of the metal member 11, the tensile load (load A2) of the metal member 11 at the deformation amount D is determined. Then, whether or not Formulae (2-1) and (2-2) are satisfied decided. If at least Formula (2-2) is satisfied, it is determined that the super-law-of-mixture is realized. In this Example, Formula (2-1) is defined as "criterion 1", and Formula (2-2) is defined as "criterion 2". A degree of the super-law-of-mixture is calculated by C/(A2+B), but when criterion 1 is also satisfied, a degree of the super-law-of-mixture corresponding to criterion 1 is calculated as C/(A1+B). The degree of the super-law-of-mixture is preferably 1.01 or more, and more preferably 1.05 or more. For example, when Formula (2-1) is satisfied, the maximum load of the composite is more than the total loads of each component alone, by preferably 1% or more, more preferably 5% or more. That is, a degree of the super-law-of-mixture is preferably 1.01 or more, and more preferably 1.05 or more. In this case, in the test specimen, it is preferable that the size of the metal member and the FRP alone is the same as the size of the metal member and the FRP layer in the composite test specimen. In the above-mentioned determination of necessity of degreasing (pretreatment step), the present method can also confirm the presence or absence of the super-law-of-mixture in advance.

If individual materials of the metal member 11 and the FRP layer 12 is not available and only the metal-FRP composite body is available, the metal member 11 is peeled off from the FRP layer 12 to obtain individual members, respectively. If it is difficult to peel off, using a grinder or the like to which a diamond whetstone has adhered, a material in which only the metal member 11 of the metal-FRP composite body has been scraped off, and a material in which only the FRP layer 12 has been scraped off, are prepared. By performing the tensile test on the respective specimens, the tensile load of the individual component alone is measured.

If individual materials of the metal member 11 and the FRP layer 12 is not available and only the metal-FRP composite body is available, the metal member 11 is peeled off from the FRP layer 12 to obtain individual members, respectively. If it is difficult to peel off, using a grinder or the like to which a diamond whetstone has adhered, a material in which only the metal member 11 of the metal-FRP composite body has been scraped off, and a material in which only the FRP layer 12 has been scraped off, are prepared. By performing the tensile test on the respective specimens, the tensile load of the individual component alone is measured.

Specifically, cut out three test specimens from the metal-FRP composite body. The size of each test specimen may be determined according to the size of the obtained metal-FRP composite body or the like, but may be, for example, a strip having a width of 25 mm and a length of 200 mm. In order to prevent the test specimen from being damaged by a test specimen holding mechanism such as a chuck of a tensile tester, a glass epoxy tab generally specified in a standard such as JIS K7164: 2005 is attached to the test specimen. These are referred to as first to third test specimens. Then, by observing the cross section of any of the test specimens in accordance with the cross-sectional method of the optical method of JIS K 5600-1-7, 5.4, the thicknesses of the metal member 11, the FRP layer 12, and the adhesive resin layer 13 were measured. Subsequently, the maximum load of the metal-FRP composite body is measured by performing the above-described tensile test on the first test piece. That is, the first test specimen is used as the metal-FRP composite body.

On the other hand, the FRP layer 12 and the adhesive resin layer 13 are removed from the second test specimen. The removal method is as described above. That is, the second test specimen is used as the metal member 11. When the FRP layer 12 and the adhesive resin layer 13 are scraped off, the metal member 11 of about 5 to 10% of the measured thickness of the metal member 11 may be scraped off. The error in the measured thickness is taken into account. On the other hand, there is no problem even if the adhesive resin layer 13 slightly remains on the metal member 11. This is because the maximum load of the adhesive resin layer 13 is negligibly smaller than the maximum load of the metal member 11. Next, the maximum load (load A1) of the metal member 11 is measured by performing the above-described tensile test on the second test specimen. Further, a tensile load (load A2) of the metal member 11 at the deformation amount D is obtained based on the deformation amount D when the load C is measured and the result of the tensile test of the metal member 11.

On the other hand, the metal member 11 and the adhesive resin layer 13 are removed from the third test specimen. The removal method is as described above. That is, the third test specimen is used as the FRP layer 12. When the metal member 11 and the adhesive resin layer 13 are scraped off, the FRP layer 12 of about 5 to 10% of the measured thickness of the FRP layer 12 may be scraped off. The error in the measured thickness is taken into account. On the other hand, there is no problem even if the adhesive resin layer 13 slightly remains in the FRP layer 12. This is because the maximum load of the adhesive resin layer 13 is negligibly smaller than the maximum load of the FRP layer 12. Next, the maximum load of the FRP layer 12 is measured by performing the above-described tensile test on the third test specimen. Then, it may be determined whether or not the super-law-of-mixture is satisfied based on each measured value and Formulae (2-1) and (2-2) (preferably, Formula (2-2)). The method for measuring the tensile load of the respective materials, i.e., the metal member and the FRP in the composite body in the case where the metal member has been subjected to the surface treatment can be carried out in the same manner as described above.

The method for measuring the tensile load of the respective materials, i.e., the metal member and the FRP in the composite body in the case where the metal member has been subjected to the surface treatment can be carried out in the same manner as described above.

[Corrosion Resistance Evaluation Method]

The corrosion resistance of each sample prepared as described below was evaluated as follows.

When the complex metal corrodes due to the FRP, it means that an internal battery is generated by energizing the metal through the FRP layer 12 to cause electrolytic corrosion. Therefore, when the metal member 11, the FRP layer 12, and the adhesive resin layer 13 are laminated as shown in FIG. 1, the corrosion resistance of each sample can be evaluated by measuring the resistance value when a current is applied in the direction perpendicular to the surface of each layer (that is, in the thickness direction of each layer) so as to penetrate each layer The method of measuring the resistance value and the evaluation of the corrosion resistance were as follows.

First, terminals were attached to both the FRP layer 12 and the metal member 11. At this time, in order to reduce contact resistance of the sample, carbon paper (TGP-H-120 manufactured by Toray Industries, Inc.) was sandwiched between the platinum terminal and the sample, and the terminal was pressed against the sample with a pressure of 2 MPa. Then, a current having a current density of 1 $A/cm^2$ was applied to the measurement area of 2 cm×2 cm to measure the resistance value.

Here, the power supply device and the resistance value measuring device to be used can be selected arbitrarily, but in a measurement area of 2 cm×2 cm, a power supply device capable of flowing a current of 1 $A/cm^2$ and a resistance value measuring device having a measurement accuracy capable of measuring a resistance value in units of 10 mΩ are preferably used. Therefore, in this example, PAN16-10A manufactured by Kikusui Electronics Co., Ltd. was used as the power source, and Multimeter 34401A manufactured by Hewlett-Packard Company was used as the resistance value measuring device.

In the composition ratio of each layer of each sample prepared as in the following examples and comparative examples, when the resistance value obtained by the above method is less than 100 mΩ, it was found that electrolytic corrosion is likely to occur, which causes corrosion that cannot be overlooked from the experimental results. Therefore, if the resistance value was 100 mΩ or more, it was determined that the combination of types of the corresponding FRP layer and the adhesive resin layer had corrosion resistance, and if it was less than 100 mΩ, it was determined that it had no corrosion resistance. In the table shown below, a case where the resistance value is 100 mmΩ or more is represented as a score "A", and a case where the resistance value is less than 100 mmΩ is represented as a score "B".

In addition, in the composite material of FRP and metal material in the application, if the thickness of the adhesive resin layer is too thin, the adhesive force cannot be sufficiently secured, and the physical properties of the composite material are adversely affected. Further, if the thickness of the adhesive resin layer is too thick, wasteful adhesive will be used, resulting in poor economic efficiency. Further, if it is too thick, it will be difficult to obtain the composited effect with FRP, and the physical properties is likely to be adversely affected. Therefore, the thickness of the adhesive resin layer is preferably 10 to 60 μm, and the most preferable thickness is 20 to 30 μm. From such knowledge, the measurement of the resistance value in the present invention was performed mainly in the thickness range as described above. That is, even if it is a resin composition that originally does not exhibit corrosion resistance, the resistance value becomes large when the thickness is extremely increased. However, the economical efficiency is poor, and if it is too thick, the characteristics are also impaired. Because this is not one which the present invention is intended.

Also, the value of 100 mmΩ used as the standard here is a numerical value used to judge the measurement system and the electrolytic corrosion resistance of the test piece, and if the measurement system changes, the appropriate resistance value also changes. Therefore, the appropriate resistance value in the measurement system is determined in consideration of the actual degree of corrosion.

A sample of the metal-FRP composite body used for various measurements and evaluations as described above was prepared as follows.

[CFRP Prepreg]

As the phenoxy resin, Phenototo YP-50S (bisphenol A type manufactured by Nippon Steel & Sumikin Chemical Co., Ltd., Mw=40,000, hydroxyl equivalent=284 g/eq, melt viscosity at 250° C.=90 Pa·s, Tg=83° C.) was used. A powder having an average particle diameter D50 of 80 μm obtained by pulverizing and classifying such a phenoxy resin was powder coated to the reinforcing fiber base material made of a carbon fiber (cloth material: Toho Tenax Co., IMS 60) or glass fiber (Example 12) in an electrostatic field under the conditions of an electric charge of 70 kV and a blowing air pressure of 0.32 MPa. After that, the resin was heat-melted in an oven at 170° C. for 1 minute to heat-bond the resin to produce a phenoxy resin CFRP prepreg having a fiber volume content Vf of 60%.

In Example 4 below, instead of using Phenototo YP-50S alone, a crosslinked cured product wherein Phenototo YP-50S and an epoxy resin (Tetramethylbisphenol F type manufactured by Nippon Steel & Sumikin Chemical Co., Ltd., epoxy equivalent 192 g/eq, melting point 72° C.) were crosslinked with ethylene glycol bisanhydrotrimellitate (TMEG) as a crosslinking agent was used. The crosslinked cured product was measured at a temperature within the range of 20 to 280° C. under a temperature rising condition of 10° C./min using a differential scanning calorimeter, and the glass transition temperature was measured from the value calculated from the peak value of the second scan. It was 183° C.

[Adhesive Sheet]

Using polypropylene (PP), nylon 6 (PA6), polycarbonate (PC), and the above-mentioned phenoxy resin (Phenototo YP-50S) as shown below, an adhesive sheet which will later be the adhesive resin layer was prepared. In addition, when the storage elastic modulus of each of the above resins was separately measured by a thermomechanical analyzer (DMS6100 manufactured by Seiko Instruments Inc.), polypropylene and nylon 6 showed the storage elastic modulus as shown in FIG. 4A, and polycarbonate showed the storage elastic modulus as shown in FIG. 4B. Further, the obtained adhesive sheet was measured using a differential scanning calorimeter at a temperature within a range of 20 to 280° C. under a temperature rising condition of 10° C./min. From a value calculated from a peak value of the second scan, the glass transition temperature was separately measured. The obtained results are shown in Table 1-1, Table 1-2 and Table 2 below.

PP: ADMER QE060 manufactured by Mitsui Chemicals, Inc.

PA6: CAS number: 63428-83-1 manufactured by Aldrich

PC: CAS number: 25037-45-0 manufactured by Aldrich

Specifically, pellets of each of the above resins were molded into a sheet having a thickness of 30 to 60 μm under heating and pressurization conditions of 250° C. (200° C. for PP), 1 MPa and 5 minutes. In Examples 5 and 6 shown below, resin sheets were produced by changing the compounding ratio of the phenoxy resin and the polypropylene.

[Metal Member]

The following 6 types of metal members were used as the metal members. The following metal members were all degreased with acetone before use.

Tin-free steel plate (soft steel) made by Nippon Steel & Sumikin Co., Ltd., thickness 0.21 mm Pure aluminum plate made by The Niraco Corporation, thickness 0.1 mm Plate of magnesium alloy AZ31B manufactured by Nippon Kinzoku Co., Ltd., thickness 0.1 mm Commercially available aluminum alloy A5052 plate, thickness 0.6 mm Pure titanium plate made by The Niraco Corporation, thickness 0.1 mm Hot-dip galvanized high-strength steel sheet (high-tensile steel) made by Nippon Steel & Sumikin Co., Ltd., thickness 0.42 mm The metal member, the phenoxy resin CFRP prepreg, and the adhesive sheet as shown above were respectively combined as shown in Tables 1 and 2 as described below to form a stack, and the obtained stack was pressed with a press machine heated to 250° C. at 5.0 MPa for 5 minutes to obtain a metal-FRP composite body sample. Here, considering the behavior of the storage modulus of the obtained polypropylene and nylon 6, the storage modulus of polypropylene and nylon 6 is larger than that of the phenoxy resin at the processing temperature of 250° C. In the table below, the case where the storage modulus of the resin constituting the adhesive resin layer is larger than the storage modulus of the phenoxy resin at the processing temperature of 250° C. is represented as a score "A". The case where the storage modulus of the resin constituting the adhesive resin layer is equal to or smaller than the storage modulus of the phenoxy resin at the processing temperature of 250° C. is represented as a score "B".

The thickness of the adhesive resin layer 13 was 20 to 60 μm. In addition, dust and other deposits were previously removed from the surface of the mold provided in the press machine, and the release agent was applied in advance. Each sample thus obtained was subjected to a tensile test after cooling. The obtained results are also shown in Tables 1-1, 1-2 and 2 below.

In Example 14, except that the hot dip galvanized high-strength steel sheet manufactured by Nippon Steel & Sumikin Co., Ltd. having a thickness of 0.42 mm, was not degreased with acetone and was used as the metal member with oil remaining on the surface, a metal-FRP composite body sample was prepared in the same manner as in Example 13.

In Example 15, a hot dip galvanized high-strength steel sheet manufactured by Nippon Steel & Sumikin Co., Ltd. having a thickness of 0.42 mm was sufficiently degreased with acetone as a metal member. Subsequently, in order to quantitatively adhere the oil component to the surface of the metal member, rustproof oil, Daphne Oil Coat Z3 manufactured by Idemitsu was applied at an amount of 5 g/m$^2$, and then lightly applied with a waste cloth to sucked up the amount of oil that dripped down, and the resulting metal member was used. On such a metal member, an oil-surface bonding adhesive, Alpha Tech 370, manufactured by Alpha Industry Co., Ltd. was applied in an amount of 3 g/m$^2$. A sample of the metal-CFRP composite body was prepared in the same manner as in Example 13 except for the above points.

In Example 16, a hot dip galvanized high-strength steel sheet manufactured by Nippon Steel & Sumikin Co., Ltd. having a thickness of 0.42 mm was sufficiently degreased with acetone as a metal member. Subsequently, in order to quantitatively adhere the oil component to the surface of the metal member, a rustproof oil, Daphne Oil Coat Z3 manufactured by Idemitsu was applied in an amount of 5 g/m$^2$ and the resulting metal member was used. On such a metal member, 50 parts by mass of finely pulverized ADMER QE060 manufactured by Mitsui Chemicals, and a mixture of a main agent and a curing agent at a mass ratio of 100:30 of Alpha Tech 370 manufactured by Alpha Industry Co., Ltd. was prepared in an amount of 50 parts by mass, as an oil-surface bonding adhesive and these mixtures were applied in an amount of 4 g/m$^2$. A sample of the metal-CFRP composite body was prepared in the same manner as in Example 13 except for the above points.

In Example 17, a sample of a metal-CFRP composite body was prepared in the same manner as in Example 13 except that, a product obtained by laminating 15 g of CFRP prepreg and 3.4 g of ADMER QE060 manufactured by Mitsui Chemicals, and pressing at 5.0 MPa for 5 minutes with a press machine heated to 250° C. was used as CFRP prepreg. The ratio of the resin composition in the prepreg is about 6:4 in mass ratio and about 52:48 in volume ratio between the phenoxy resin and ADMER QE060 manufactured by Mitsui Chemicals.

Further, in Comparative Example 5, a metal-CFRP composite body sample was prepared in the same manner as in Example 13 except that, as a metal member, hot-dip galvanized high-strength steel sheet manufactured by Nippon Steel & Sumikin Co., Ltd., having a thickness of 0.42 mm, was sufficiently degreased with acetone, and then the rustproof oil, Daphne Oil Coat Z3 manufactured by Idemitsu was applied at an amount of 5 g/m$^2$ in order to quantitatively apply the oil component to the surface of the metal member.

In Comparative Example 6, as a metal member, a hot dip galvanized high-strength steel sheet manufactured by Nippon Steel & Sumikin Co., Ltd. having a thickness of 0.42 mm was sufficiently degreased with acetone, and then a rustproof oil, Daphne Oil Coat Z3 manufactured by Idemitsu was applied in an amount of 5 g/m$^2$ in order to quantitatively apply an oil component to the surface of the metal member and the resulting metal member was used. A metal-CFRP composite body sample was prepared in the same manner as in Example 13 except that, on such a metal member, an oil-surface bonding adhesive, Alpha Tech 370, manufactured by Alpha Industry Co., Ltd. was applied in an amount of 3 g/m$^2$.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| FRP Layer | Matrix Resin Type | YP-50S | YP-50S | YP-50S | YP-50S + epoxy | YP-50S | YP-50S | YP-50S | YP-50S | YP-50S | YP-50S |
| | Glass Transition Temperature | 83° C. | 83° C. | 83° C. | 183° C. | 83° C. | 83° C. | 83° C. | 83° C. | 83° C. | 83° C. |
| | Fiber Type | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 |
| | Thickness(mm) | 0.65 | 0.65 | 0.65 | 0.65 | 0.65 | 0.65 | 0.65 | 0.65 | 0.65 | 0.65 |
| | Modulus Coefficient E2 (GPa) | 75 | 75 | 75 | 75 | 75 | 75 | 75 | 75 | 75 | 75 |
| | Max Load B(N) | 13500 | 13500 | 13500 | 13500 | 13500 | 13500 | 13500 | 13500 | 13500 | 13500 |
| Adhesive Resin Layer | Resin Type | PA6 | PC | PP Mitsui Chemicals ADMER QE060 | PP Mitsui Chemicals ADMER QE060 | PP:Phenoxy = 75:25 | PP:Phenoxy = 51:49 | PP Mitsui Chemicals ADMER QE060 | PP Mitsui Chemicals ADMER QE060 | PP Mitsui Chemicals ADMER QE060 | PP Mitsui Chemicals ADMER QE060 |
| | Glass Transition Temperature | 30° C. | 150° C. | 0° C. | 0° C. | 0° C. | 0° C. | 0° C. | 0° C. | 0° C. | 0° C. |
| | Thickness(mm) | 0.03 | 0.03 | 0.03 | 0.03 | 0.03 | 0.03 | 0.03 | 0.03 | 0.03 | 0.03 |
| | Relationship of Storage Modulus | A | A | A | A | A | A | A | A | A | A |
| Metal Member | Metal Type | Soft Steel | Soft Steel | Soft Steel | Soft Steel | Soft Steel | Soft Steel | Soft Steel | Mg Alloy | Pure Al | Al Alloy 5052 |
| | Surface | TFS | TFS | TFS | TFS | TFS | TFS | TFS | no | no | no |
| | Thickness(mm) | 0.21 × 2 | 0.21 × 2 | 0.21 × 2 | 0.21 × 2 | 0.21 × 2 | 0.21 × 2 | 0.12 × 2 | 0.10 × 2 | 0.10 × 2 | 0.60 × 2 |
| | Modulus Coefficient E1 (GPa) | 200 | 200 | 200 | 200 | 200 | 200 | 200 | 43 | 70 | 73 |
| | Max Load A1(N) | 2000 × 2 | 2000 × 2 | 2000 × 2 | 2000 × 2 | 2000 × 2 | 2000 × 2 | 1700 × 2 | 800 × 2 | 500 × 2 | 3500 × 2 |
| | Load at Elongation at Which Metal-FRP Composite Body is Broken A2(N) | 1800 × 2 | 1800 × 2 | 1800 × 2 | 1800 × 2 | 1800 × 2 | 1800 × 2 | 1500 × 2 | 700 × 2 | 470 × 2 | 3200 × 2 |
| Physical Properties, Evaluation Items | Corrosion Resistance | A | A | A | A | A | A | A | A | A | A |
| | Shear Strength (MPa) | 5.80 | 4.96 | 5.00 | 5.00 | 4.00 | 4.00 | 5.00 | 1.00 | 4.00 | 4.00 |
| | T1 × E1/T2 × E2 | 1.72 | 1.72 | 1.72 | 1.72 | 1.72 | 1.72 | 0.98 | 0.18 | 0.29 | 1.80 |
| | Max Load C(N) | 26000 | 27000 | 25000 | 23500 | 20000 | 20000 | 22000 | 14000 | 14500 | 21000 |
| | Oil-Film Countermeasure | Present(Acetone Degreasing) | Yes(Acetone Degreasing) | Present(Acetone Degreasing) | Yes(Acetone Degreasing) | Yes(Acetone Degreasing) | Yes(Acetone Degreasing) | Yes(Acetone Degreasing) | Yes(Acetone Degreasing) | Yes(Acetone Degreasing) | Yes(Acetone Degreasing) |
| | Super-Law-of-Mixture Criterion 1 | yes | yes | yes | yes | yes | yes | yes | no | no | yes |
| | Degree of Super-Law-of-Mixture Criterion 1 | 1.49 | 1.54 | 1.43 | 1.34 | 1.14 | 1.14 | 1.30 | 0.93 | 1.00 | 1.02 |
| | Super-Law-of-Mixture Criterion 2 | yes | yes | yes | yes | yes | yes | yes | no | yes | yes |
| | Degree of Super-Law-of-Mixture Criterion 2 | 1.52 | 1.58 | 1.46 | 1.37 | 1.17 | 1.17 | 1.33 | 0.94 | 1.00 | 1.06 |

TABLE 1-continued

| | | Example 11 | Example 12 | Example 13 | Example 14 | Example 15 | Example 16 | Example 17 |
|---|---|---|---|---|---|---|---|---|
| FRP Layer | Matrix Resin Type | YP-50S | YP-50S | YP-50S | YP-50S | YP-50S | YP-50S | YP-50S + QE060 |
| | Glass Transition Temperature | 83° C. | 83° C. | 83° C. | 83° C. | 83° C. | 83° C. | (Due to Mixture, Unable to Specifically Determine) |
| | Fiber Type | Cloth Tohotenax IMS60 Vf60 | Cloth GF | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 |
| | Thickness(mm) | 0.65 | 0.32 | 0.16 | 0.16 | 0.16 | 0.16 | 0.19 |
| | Modulus Coefficient E2 (GPa) | 75 | 20 | 75 | 75 | 75 | 75 | 63 |
| | Max Load B(N) | 13500 | 2900 | 3170 | 3170 | 3170 | 3170 | 3170 |
| Adhesive Resin Layer | Resin Type | PP Mitsui Chemicals ADMER QE060 | PP Mitsui Chemicals ADMER QE060 | PP Mitsui Chemicals ADMER QE060 | PP Mitsui Chemicals ADMER QE060 | PP Mitsui Chemicals ADMER QE060 | PP Mitsui Chemicals ADMER QE060 | PP Mitsui Chemicals ADMER QE060 |
| | Glass Transition Temperature | 0° C. | 0° C. | 0° C. | 0° C. | 0° C. | 0° C. | 0° C. |
| | Thickness(mm) | 0.03 | 0.03 | 0.03 | 0.03 | 0.03 | 0.03 | 0.03 |
| | Relationship of Storage Modulus | A | A | A | A | A | A | A |
| Metal Member | Metal Type | Ti | Soft Steel | High Tensile Steel | High Tensile Steel | High Tensile Steel | High Tensile Steel | High Tensile Steel |
| | Surface | None | TFS | Galvanized | Galvanized | Galvanized | Galvanized | Galvanized |
| | Thickness(mm) | 0.10 × 2 | 0.21 × 2 | 0.42 | 0.42 | 0.42 | 0.42 | 0.42 |
| | Modulus Coefficient E1 (GPa) | 106 | 200 | 200 | 200 | 200 | 200 | 200 |
| | Max Load A1(N) | 900 × 2 | 2000 × 2 | 6700 | 6700 | 6700 | 6700 | 6700 |
| | Load at Elongation at Which Metal-FRP Composite Body is Broken A2(N) | 840 × 2 | 1800 × 2 | 4500 | 4500 | 4500 | 4500 | 4500 |
| Physical Properties, Evaluation Items | Corrosion Resistance | A | A | A | A | A | A | A |
| | Shear Strength (MPa) | 1.20 | 5.00 | 8.10 | 4.30 | 3.40 | 6.70 | 9.60 |
| | T1 × E1/T2 × E2 | 0.43 | 13.13 | 7.00 | 7.00 | 7.00 | 7.00 | 7.02 |
| | Max Load C(N) | 16000 | 7000 | 8330 | 8080 | 7750 | 8540 | 8980 |
| | Oil-Film Countermeasure | Yes(Acetone Degreasing) | Present(Acetone Degreasing) | Yes(Acetone Degreasing) | No(No Degreasing) | Yes(Small Amount of Rustproof Oil + Oil-Surface Adhesivce) | Yes (Rustproof Oil + Kneading Adhesive) | Yes(Acetone Degreasing) |
| | Super-Law-of-Mixture Criterion 1 | yes | yes | no | no | no | no | no |
| | Super-Law-of-Mixture Criterion 2 | yes | yes | yes | yes | yes | yes | yes |
| | Degree of Super-Law-of-Mixture Criterion 1 | 1.05 | 1.01 | 0.84 | 0.82 | 0.79 | 0.87 | 0.91 |
| | Degree of Super-Law-of-Mixture Criterion 2 | 1.05 | 1.08 | 1.09 | 1.05 | 1.01 | 1.11 | 1.17 |

TABLE 2

|  |  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- |
| FRP Layer | Matrix Resin Type | YP-50S | YP-50S | YP-50S | YP-50S | YP-50S | YP-50S |
|  | Glass Transition Temperature | 83° C. | 83° C. | 83° C. | 83° C. | 83° C. | 83° C. |
|  | Fiber Type | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 | Cloth Tohotenax IMS60 Vf60 |
|  | Thickness(mm) | 0.65 | 0.65 | 0.65 | 0.16 | 0.16 | 0.16 |
|  | Modulus Coefficient E2 (GPa) | 75 | 75 | 75 | 75 | 75 | 75 |
|  | Max Load B(N) | 13500 | 13500 | 13500 | 3170 | 3170 | 3170 |
| Adhesive Resin Layer | Resin Type | YP-50S | no | PP (Not Aicd Anhydride, Simple PP) | YP-50S | PP Mitsui Chemicals ADMER QE060 | PP Mitsui Chemicals ADMER QE060 |
|  | Glass Transition Temperature | 83° C. | — | 0° C. | 83° C. | 0° C. | 0° C. |
|  | Thickness(mm) | 0.03 | — | 0.03 | 0.03 | 0.03 | 0.03 |
|  | Relationship of Storage Modulus | B | — | A | B | A | A |
| Metal Member | Metal Type | Soft Steel | Soft Steel | Soft Steel | High Tensile Steel | High Tensile Steel | High Tensile Steel |
|  | Surface | TFS | TFS | TFS | Galvanized | Galvanized | Galvanized |
|  | Thickness(mm) | 0.21 × 2 | 0.21 × 2 | 0.21 × 2 | 0.42 | 0.42 | 0.42 |
|  | Modulus Coefficient E1 (GPa) | 200 | 200 | 200 | 200 | 200 | 200 |
|  | Max Load A1(N) | 2000 × 2 | 2000 × 2 | 2000 × 2 | 6700 | 6700 | 6700 |
|  | Load at Elongation at Which Metal-FRP Composite Body is Broken A2(N) | 1800 × 2 | 1800 × 2 | 1800 × 2 | 4500 | 4500 | 4500 |
| Physical Properties, Evaluation Items | Corrosion Resistance | B | B | — | B | A | A |
|  | Shear Strength (MPa) | 4.90 | 4.90 | less than 0.80 (Impossible to Measure Due to Delamination) | 12.30 | less than 0.80 (Impossible to Measure Due to Delamination) | 0.30 |
|  | T1 × E1/T2 × E2 | 1.72 | 1.72 | — | 7.00 | — | 7.00 |
|  | Max Load C(N) | 18500 | 23000 | Impossible to Measure | 8500 | Impossible to Measure | 7500 |
|  | Oil-Film Countermeasure | Yes (Acetone Degreasing) | Yes(Acetone Degreasing) | Yes(Acetone Degreasing) | Yes(Acetone Degreasing) | No(Rustproof Oil Applied) | No(Large Amount of Rustproof Oil + Oil-Surface Adhesive) |
|  | Super-Law-of-Mixture Criterion 1 | yes | yes | — | no | — | no |
|  | Super-Law-of-Mixture Criterion 2 | yes | yes | — | yes | — | no |
|  | Degree of Super-Law-of-Mixture Criterion 1 | 1.06 | 1.31 | — | 0.86 | — | 0.76 |
|  | Degree of Super-Law-of-Mixture Criterion 2 | 1.08 | 1.35 | — | 1.11 | — | 0.98 |

As is clear from Table 1-1, Table 1-2 and Table 2 above, in Examples 1 to 17 which are within the scope of the present invention, as compared to Comparative Examples 1 and 4 in which the main component of the adhesive resin layer is a phenoxy resin, Comparative Example 2 in which the adhesive resin layer was not provided and Comparative Examples 3, 5, and 6 in which the shear strength was less than 0.8 MPa, an excellent corrosion resistance was exhibited, and the metal member 11 and the FRP layer 12 were in close contact with each other and were integrated, resulting in excellent mechanical properties. Further, from the above Table 1-2, it became clear that the performance of the oil-adhered ones can be recovered by using the oil-surface bonding adhesive. However, the adhesion is not stable with a subtle amount of oil, and it is preferable to remove oil by degreasing.

Incidentally, when the corrosion resistance was evaluated in Comparative Example 1 shown in Table 2 above, the unstable resistance results were obtained with both 100 mmΩ or less and 100 mmΩ or more being present. Therefore, in Table 2 above, the evaluation of the corrosion resistance of Comparative Example 1 is given as the score "B". Further, in Comparative Example 3 shown in Table 2 above, the metal plate and the FRP layer were not adhered to each other and a sample could not be prepared. Therefore, the corrosion resistance could not be evaluated.

Although the preferred embodiments of the present invention have been described above in detail with reference to the accompanying drawings, the present invention is not limited to such examples. It is apparent that those skilled in the art to which the present invention pertains can conceive various changes or modifications within the scope of the technical thought described in the claims. It is understood that these changes and modifications also naturally belong to the technical scope of the present invention.

REFERENCE SIGNS LIST 1,2 metal-FRP composite body
11 metal member
12 FRP layer
13 adhesive resin layer
20 adhesive sheet
21 FRP molding prepreg
101 matrix resin
102 reinforcing fiber material

The invention claimed is:

1. A metal-fiber reinforced resin material composite body comprising
a metal member, a fiber-reinforced resin material laminated on at least one surface of the metal member to form a composite with the metal member, and
an adhesive resin layer interposed between the metal member and the fiber-reinforced resin material,
wherein the fiber-reinforced resin material comprises a matrix resin containing 50 parts by mass or more of a phenoxy resin with respect to 100 parts by mass of a resin component, and a reinforcing fiber material contained in the matrix resin,
wherein a concentration of the phenoxy resin in a resin component of the adhesive resin layer is lower than the concentration of the phenoxy resin in the resin component of the matrix resin,
wherein the concentration of the phenoxy resin in the resin component of the adhesive resin layer is more than 0 parts by mass and less than 50 parts by mass with respect to 100 parts by mass of the resin component,
wherein a shear strength between the metal member and the fiber-reinforced resin material is 0.8 MPa or more as measured by JIS K 6850:1999,
wherein the following Formula (2-2) is satisfied $$C > A2 + B \quad \text{Formula (2-2)}$$

wherein, in the above Formula (2-2), A2 represents a tensile load of the metal member alone when the metal-fiber reinforced resin material composite body is broken, B represents a maximum load of the fiber-reinforced resin material alone, and C is a maximum load of the metal-fiber reinforced resin material composite body, and
wherein the resin component of the adhesive resin layer is a resin component in a state having a storage elastic modulus higher than that of the phenoxy resin in a temperature range not lower than a glass transition temperature of the phenoxy resin and not higher than a processing temperature when the fiber-reinforced resin material is heated and pressure-bonded.

2. The metal-fiber reinforced resin material composite body according to claim 1, wherein a degree of super-law-of-mixture that is a ratio of the load C to the total load of the load A2 and the load B is 1.01 or more.

3. The metal-fiber reinforced resin material composite body according to claim 2, wherein the degree of super-law-of-mixture is 1.05 or more.

4. The metal-fiber reinforced resin material composite body according to claim 1, wherein a total thickness T1 of the metal member and an elastic coefficient E1 of the metal member, and a total thickness T2 of the fiber-reinforced resin material and the adhesive resin layer and an elastic coefficient E2 of the fiber-reinforced resin material and the adhesive resin layer satisfy the relationship of the following Formula (1)

$$(T1 \times E1)/(T2 \times E2) > 0.3 \quad \text{Formula (1)}.$$

5. The metal-fiber reinforced resin material composite body according to claim 1, wherein the resin component of the adhesive resin layer is a resin component having a storage elastic modulus higher than that of the phenoxy resin.

6. The metal-fiber reinforced resin material composite body according to claim 1, wherein the resin component of the adhesive resin layer comprises a thermoplastic resin.

7. The metal-fiber reinforced resin material composite body according to claim 1, wherein the resin component of the adhesive resin layer comprises a crosslinked cured product of a thermoplastic resin.

8. The metal-fiber reinforced resin material composite body according to claim 1, wherein the matrix resin is a crosslinked cured product of a crosslinkable resin composition at least containing 50 parts by mass or more of the phenoxy resin with respect to 100 parts by mass of the resin component, and a glass transition temperature of the crosslinked cured product is 160° C. or higher.

9. The metal-fiber reinforced resin material composite body according to claim 1, wherein the matrix resin is a crosslinked cured product of a crosslinkable resin composition containing the phenoxy resin (A) in the range of 50 parts by mass or more with respect to 100 parts of mass of the resin component and a crosslinkable curable resin (B) in the range of 5 parts by mass or more and 85 parts by mass or less with respect to 100 parts by mass of the phenoxy resin (A).

10. A metal-fiber reinforced resin material composite body comprising
a metal member,
a fiber-reinforced resin material laminated on at least one surface of the metal member to form a composite with the metal member, and
an adhesive resin layer interposed between the metal member and the fiber-reinforced resin material,
wherein the fiber-reinforced resin material comprises a matrix resin and a reinforcing fiber material contained in the matrix resin,
wherein the matrix resin is a crosslinked cured product of a crosslinkable resin composition containing a phenoxy resin (A) in the range of 50 parts by mass or more with respect to 100 parts by mass of a resin component and a crosslinkable curable resin (B) in the range of 5 parts by mass or more and 85 parts by mass or less with respect to 100 parts by mass of the phenoxy resin (A),
wherein a concentration of the phenoxy resin in a resin component of the adhesive resin layer is lower than the concentration of the phenoxy resin in the resin component of the matrix resin,
wherein the concentration of the phenoxy resin in the resin component of the adhesive resin layer is more than 0 parts by mass and less than 50 parts by mass with respect to 100 parts by mass of the resin component,
wherein a shear strength between the metal member and the fiber-reinforced resin material is 0.8 MPa or more as measured by JIS K 6850: 1999,
wherein the following Formula (2-2) is satisfied $$C > A2 + B \quad \text{Formula (2-2)}$$

wherein, in the above Formula (2-2), A2 represents a tensile load of the metal member alone when the metal-fiber reinforced resin material composite body is broken, B represents a maximum load of the fiber-reinforced resin material alone, and C is a maximum load of the metal-fiber reinforced resin material composite body, and wherein the resin component of the adhesive resin layer is a resin component in a state having a storage elastic modulus higher than that of the phenoxy resin in a temperature range not lower than a glass transition temperature of the phenoxy resin and not higher than a processing temperature when the fiber-reinforced resin material is heated and pressure-bonded.

11. The metal-fiber reinforced resin material composite body according to claim 10, wherein a glass transition temperature changes by heating before and after the resin component of the matrix resin changes from a solidified product in a first cured state to a crosslinked cured product in a second cured state.

12. The metal-fiber reinforced resin material composite body according to claim 10, wherein a degree of super-law-of-mixture that is a ratio of the load C to the total load of the load A2 and the load B is 1.01 or more.

13. The metal-fiber reinforced resin material composite body according to claim 12, wherein the degree of super-law-of-mixture is 1.05 or more.

14. The metal-fiber reinforced resin material composite body according to claim 10, wherein a total thickness T1 of the metal member and an elastic coefficient E1 of the metal member, and a total thickness T2 of the fiber-reinforced resin material and the adhesive resin layer and an elastic coefficient E2 of the fiber-reinforced resin material and the adhesive resin layer satisfy the relationship of the following Formula (1)

$$(T1 \times E1)/(T2 \times E2) > 0.3 \qquad \text{Formula (1)}.$$

15. The metal-fiber reinforced resin material composite body according to claim 10, wherein the resin component of the adhesive resin layer is a resin component having a storage elastic modulus higher than that of the phenoxy resin.

16. The metal-fiber reinforced resin material composite body according to claim 10, wherein the resin component of the adhesive resin layer comprises a thermoplastic resin.

17. The metal-fiber reinforced resin material composite body according to claim 10, wherein the resin component of the adhesive resin layer comprises a crosslinked cured product of a thermoplastic resin.

18. The metal-fiber reinforced resin material composite body according to claim 10, wherein a glass transition temperature of the matrix resin is 160° C. or higher.

* * * * *